US012627450B2

(12) United States Patent
Ma et al.

(10) Patent No.: US 12,627,450 B2
(45) Date of Patent: May 12, 2026

(54) PHASE NOISE DETERMINING METHOD AND RELATED APPARATUS

(71) Applicant: HUAWEI TECHNOLOGIES CO., LTD., Shenzhen (CN)

(72) Inventors: Qianli Ma, Chengdu (CN); Nuwan Suresh Ferdinand, Ottawa (CA); Huang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 413 days.

(21) Appl. No.: 18/474,889

(22) Filed: Sep. 26, 2023

(65) Prior Publication Data

US 2024/0022382 A1     Jan. 18, 2024

Related U.S. Application Data

(63) Continuation of application No. PCT/CN2022/083220, filed on Mar. 26, 2022.

(30) Foreign Application Priority Data

Mar. 30, 2021     (CN) .......................... 202110341555.2

(51) Int. Cl.
*H04L 5/00*          (2006.01)
*H04L 25/03*          (2006.01)

(52) U.S. Cl.
CPC ...... *H04L 5/0053* (2013.01); *H04L 25/03006* (2013.01)

(58) Field of Classification Search
CPC ........................ H04L 5/0053; H04L 25/03006
See application file for complete search history.

(56) References Cited

U.S. PATENT DOCUMENTS

2017/0126442 A1     5/2017   Hong

FOREIGN PATENT DOCUMENTS

EP          4250654 A1     9/2023

*Primary Examiner* — Elton Williams
(74) *Attorney, Agent, or Firm* — Rimon PC

(57)          ABSTRACT

A phase noise determining method and a related apparatus are provided. The method includes: A first communication apparatus obtains a first signal, where the first signal includes a data signal and K phase-tracking reference signals PTRSs, where a value of an $m^{th}$ PTRS in the K PTRSs is determined based on a value of first interference, a value of second interference, and a preset receiving value of the $m^{th}$ PTRS, the first interference is inter-symbol interference generated by the data signal on the $m^{th}$ PTRS, the second interference is inter-symbol interference generated by a PTRS other than the $m^{th}$ PTRS in the K PTRSs on the $m^{th}$ PTRS, K and m are positive integers, and $1 \leq m \leq K$.

20 Claims, 9 Drawing Sheets

First communication apparatus

Second communication apparatus

S101. Obtain a first signal, where the first signal includes a data signal and K PTRSs S102. Send a second signal, where the second signal is a signal obtained through baseband signal processing performed on the first signal S103. Obtain a third signal, where the third signal is a signal obtained through introduction of phase noise into the second signal S104. Determine the phase noise based on values of K PTRSs in the third signal and preset receiving values of the K PTRSs in the first signal

Network device          Terminal device

PHASE NOISE DETERMINING METHOD AND RELATED APPARATUS

CROSS-REFERENCE TO RELATED APPLICATIONS

This application is a continuation of International Application No. PCT/CN2022/083220, filed on Mar. 26, 2022, which claims priority to Chinese Patent Application No. 202110341555.2, filed on Mar. 30, 2021. The disclosures of the aforementioned applications are hereby incorporated by reference in their entireties.

TECHNICAL FIELD

This application relates to the field of communication technologies, and in particular, to a phase noise determining method and a related apparatus.

BACKGROUND

High frequency bands (that is, frequency bands higher than 6 GHz, mainly including 28 GHz, 39 GHz, 60 GHz, 73 GHz, and the like) have become a hotspot for research and development hotspot in industry, to meet increasing communication requirements, due to abundant frequency band resources at these high frequencies. Using such a high frequency may provide an antenna array with high bandwidth and high integration for communication to achieve a high throughput. However, a phase noise (PHN) problem with the high frequency bands is excessively prominent. Currently, a phase-tracking reference signal (PTRS) is introduced into high frequency band communications of 5th generation (5G) mobile communication technology, for phase noise estimation and compensation.

To further reduce a peak-to-average power ratio (PAPR) in high frequency communications, a corresponding optimization design may be performed on a filter of a receiving device. Usually, a designed filter is a non-Nyquist filter. Because the non-Nyquist filter introduces inter-symbol interference of adjacent code elements in a signal, the introduction of the non-Nyquist filter causes phase noise to be determined ineffectively.

SUMMARY

This application provides a phase noise determining method and a related apparatus, to effectively determine phase noise in a signal.

According to a first aspect, this application provides a phase noise determining method. The method includes: A first communication apparatus obtains a first signal, where the first signal includes a data signal and K phase-tracking reference signals PTRSs. A value of an $m^{th}$ PTRS in the K PTRSs is determined based on a value of a first interference, a value of a second interference, and a preset receiving value of the $m^{th}$ PTRS, the first interference is an inter-symbol interference generated by the data signal on the $m^{th}$ PTRS, the second interference is an inter-symbol interference generated by a PTRS other than the mt PTRS in the K PTRSs on the $m^{th}$ PTRS, K and m are positive integers, and $1 \leq m \leq K$. The first communication apparatus sends a second signal to a second communication apparatus, where the second signal is a signal obtained through baseband signal processing performed on the first signal. In this manner, values of the K PTRSs in the first signal may be preprocessed, so that under an assumed condition that there is no phase noise, a value of a PTRS received by a receive end may be determined based on a preset receiving value agreed on in advance, to eliminate any impact of inter-symbol interference on the value of the PTRS. Because the value of the PTRS actually received by the receive end is further affected by the phase noise, the phase noise may be calculated by using the actual receiving value and the preset receiving value of the PTRS.

With reference to the first aspect, in a possible implementation, the value of the first interference and the value of the second interference are determined based on a type of a receiver. Optionally, the first communication apparatus may determine, based on the type of the receiver, a calculation method for calculating the inter-symbol interference.

With reference to the first aspect, in a possible implementation, before a first communication apparatus obtains a first signal, the method further includes: The first communication apparatus obtains first indication information sent by the second communication apparatus, where the first indication information indicates the type of the receiver. In this manner, the second communication apparatus determines the type of the receiver and notifies the first communication apparatus of the type of the receiver.

With reference to the first aspect, in a possible implementation, the method further includes: The first communication apparatus sends second indication information to the second communication apparatus, where the second indication information indicates the type of the receiver. In this manner, the first communication apparatus determines the type of the receiver and notifies the second communication apparatus of the type of the receiver.

With reference to the first aspect, in a possible implementation, that a value of an $m^{th}$ PTRS in the K PTRSs is determined based on a value of first interference, a value of second interference, and a preset receiving value of the mt PTRS includes: The value of the $m^{th}$ PTRS is determined based on the value of the first interference, the value of the second interference, the preset receiving value of the $m^{th}$ PTRS, and a first parameter, where the first parameter is a value related to a signal amplitude. In this manner, a requirement on the values of the K PTRSs may be relaxed by using the first parameter.

With reference to the first aspect, in a possible implementation, the method further includes: The first communication apparatus sends third indication information to the second communication apparatus, where the third indication information indicates the first parameter.

With reference to the first aspect, in a possible implementation, that a value of an $m^{th}$ PTRS in the K PTRSs is determined based on a value of first interference, a value of second interference, and a preset receiving value of the $m^{th}$ PTRS includes: The value of the $m^{th}$ PTRS is determined based on the value of the first interference, the value of the second interference, the preset receiving value of the mt PTRS, and a second parameter, where the second parameter is a value related to a signal phase. In this manner, a requirement on the values of the K PTRSs may be relaxed by using the second parameter.

With reference to the first aspect, in a possible implementation, the method includes: The first communication apparatus sends fourth indication information to the second communication apparatus, where the fourth indication information indicates the second parameter.

According to a second aspect, this application provides a phase noise determining method. The method includes: A second communication apparatus obtains a third signal, where the third signal is a signal obtained through introduction of phase noise into a second signal sent by a first communication apparatus, and the third signal includes a data signal and K phase-tracking reference signals PTRSs. The second signal is a signal obtained through baseband signal processing performed on a first signal, the first signal includes a data signal and K PTRSs, a value of an $m^{th}$ PTRS in the K PTRSs in the first signal is determined based on a value of first interference, a value of second interference, and a preset receiving value of the mt PTRS, the first interference is inter-symbol interference generated by the data signal in the first signal on the $m^{th}$ PTRS, the second interference is inter-symbol interference generated by a PTRS other than the mt PTRS in the K PTRSs in the first signal on the $m^{th}$ PTRS, K and m are positive integers, and $1 \leq m \leq K$. The second communication apparatus determines the phase noise based on values of the K PTRSs in the third signal and preset receiving values of the K PTRSs in the first signal. In this manner, the third signal sent by a transmit end may be obtained, and the phase noise in the third signal may be calculated based on the actual received values of the K PTRSs in the third signal and the preset receiving values that are of the K PTRSs in the first signal and that are agreed on in advance.

With reference to the second aspect, in a possible implementation, before the second communication apparatus determines the phase noise based on values of the K PTRSs in the third signal and preset receiving values of the K PTRSs in the first signal, the method further includes: The second communication apparatus converts the third signal into a first frequency domain signal. The second communication apparatus performs channel equalization on the first frequency domain signal to obtain a second frequency domain signal. The second communication apparatus preprocesses the second frequency domain signal based on a receiver, and converts the processed second frequency domain signal into a first time domain signal. The second communication apparatus obtains the values of the K PTRSs in the third signal from the first time domain signal.

With reference to the second aspect, in a possible implementation, the method further includes: The second communication apparatus sends first indication information to the first communication apparatus, where the first indication information indicates a type of the receiver. In this manner, the second communication apparatus determines the type of the receiver and notifies the first communication apparatus of the type of the receiver.

With reference to the second aspect, in a possible implementation, the method further includes: The second communication apparatus obtains second indication information sent by the first communication apparatus, where the second indication information indicates a type of the receiver. In this manner, the first communication apparatus determines the type of the receiver and notifies the second communication apparatus of the type of the receiver.

With reference to the second aspect, in a possible implementation, the method further includes: The second communication apparatus converts the first frequency domain signal into a second time domain signal. The second communication apparatus performs phase noise compensation on the second time domain signal based on the phase noise.

With reference to the second aspect, in a possible implementation, the method further includes: The second communication apparatus receives third indication information sent by the first communication apparatus, where the third indication information indicates a first parameter, and the first parameter is a value related to a signal amplitude. That the second communication apparatus determines the phase noise based on values of the K PTRSs in the third signal and preset receiving values of the K PTRSs in the first signal includes: The second communication apparatus determines the phase noise based on the values of the K PTRSs in the third signal, the preset receiving values of the K PTRSs in the first signal, and the first parameter.

With reference to the second aspect, in a possible implementation, the method further includes: The second communication apparatus receives fourth indication information sent by the first communication apparatus, where the fourth indication information indicates a second parameter, and the second parameter is a value related to a signal phase. That the second communication apparatus determines the phase noise based on values of the K PTRSs in the third signal and preset receiving values of the K PTRSs in the first signal includes: The second communication apparatus determines the phase noise based on the values of the K PTRSs in the third signal, the preset receiving values of the K PTRSs in the first signal, and the second parameter.

According to a third aspect, this application provides a communication apparatus. The communication apparatus includes a transceiver unit and a processing unit. The transceiver unit is configured to obtain a first signal, where the first signal includes a data signal and K phase-tracking reference signals PTRSs. A value of an $m^{th}$ PTRS in the K PTRSs is determined based on a value of first interference, a value of second interference, and a preset receiving value of the $m^{h}$ PTRS, the first interference is inter-symbol interference generated by the data signal on the $m^{th}$ PTRS, the second interference is inter-symbol interference generated by a PTRS other than the $m^{th}$ PTRS in the K PTRSs on the $m^{th}$ PTRS, K and m are positive integers, and $1 \leq m \leq K$. The processing unit is configured to perform baseband signal processing on the first signal to obtain a second signal. The transceiver unit is further configured to send the second signal to a second communication apparatus.

With reference to the third aspect, in a possible implementation, the value of the first interference and the value of the second interference are determined based on a type of a receiver.

With reference to the third aspect, in a possible implementation, the transceiver unit is further configured to obtain first indication information sent by the second communication apparatus, where the first indication information indicates the type of the receiver.

With reference to the third aspect, in a possible implementation, the transceiver unit is further configured to send second indication information to the second communication apparatus, where the second indication information indicates the type of the receiver.

With reference to the third aspect, in a possible implementation, that a value of an $m^{th}$ PTRS in the K PTRSs is determined based on a value of first interference, a value of second interference, and a preset receiving value of the mt PTRS includes: The value of the $m^{th}$ PTRS is determined based on the value of the first interference, the value of the second interference, the preset receiving value of the $m^{th}$ PTRS, and a first parameter, where the first parameter is a value related to a signal amplitude.

With reference to the third aspect, in a possible implementation, the transceiver unit is further configured to send third indication information to the second communication apparatus, where the third indication information indicates the first parameter.

With reference to the third aspect, in a possible implementation, that a value of an $m^{th}$ PTRS in the K PTRSs is determined based on a value of first interference, a value of second interference, and a preset receiving value of the mt PTRS includes: The value of the $m^{th}$ PTRS is determined based on the value of the first interference, the value of the second interference, the preset receiving value of the $m^{th}$ PTRS, and a second parameter, where the second parameter is a value related to a signal phase.

With reference to the third aspect, in a possible implementation, the transceiver unit is further configured to send fourth indication information to the second communication apparatus, where the fourth indication information indicates the second parameter.

According to a fourth aspect, this application provides another communication apparatus. The communication apparatus includes a transceiver unit and a processing unit. The transceiver unit is configured to obtain a third signal, where the third signal is a signal obtained through introduction of phase noise into a second signal sent by a first communication apparatus, and the third signal includes a data signal and K phase-tracking reference signals PTRSs. The second signal is a signal obtained through baseband signal processing performed on a first signal, the first signal includes a data signal and K PTRSs, a value of an $m^{th}$ PTRS in the K PTRSs in the first signal is determined based on a value of first interference, a value of second interference, and a preset receiving value of the $m^{th}$ PTRS, the first interference is inter-symbol interference generated by the data signal in the first signal on the $m^{th}$ PTRS, the second interference is inter-symbol interference generated by a PTRS other than the $m^{th}$ PTRS in the K PTRSs in the first signal on the $m^{th}$ PTRS, K and m are positive integers, and $1 \le m \le K$. The processing unit is configured to determine the phase noise based on values of the K PTRSs in the third signal and preset receiving values of the K PTRSs in the first signal.

With reference to the fourth aspect, in a possible implementation, the processing unit is further configured to: convert the third signal into a first frequency domain signal; perform channel equalization on the first frequency domain signal to obtain a second frequency domain signal; preprocess the second frequency domain signal based on a receiver, and convert the processed second frequency domain signal into a first time domain signal; and obtain the values of the K PTRSs in the third signal from the first time domain signal.

With reference to the fourth aspect, in a possible implementation, the transceiver unit is further configured to send first indication information to the first communication apparatus, where the first indication information indicates a type of the receiver.

With reference to the fourth aspect, in a possible implementation, the transceiver unit is further configured to obtain second indication information sent by the first communication apparatus, where the second indication information indicates a type of the receiver.

With reference to the fourth aspect, in a possible implementation, the processing unit is further configured to: convert the first frequency domain signal into a second time domain signal; and perform phase noise compensation on the second time domain signal based on the phase noise.

With reference to the fourth aspect, in a possible implementation, the transceiver unit is further configured to obtain third indication information sent by the first communication apparatus, where the third indication information indicates a first parameter, and the first parameter is a value related to a signal amplitude. The processing unit is specifically configured to determine the phase noise based on the values of the K PTRSs in the third signal, the preset receiving values of the K PTRSs in the first signal, and the first parameter.

With reference to the fourth aspect, in a possible implementation, the transceiver unit is further configured to obtain fourth indication information sent by the first communication apparatus, where the fourth indication information indicates a second parameter, and the second parameter is a value related to a signal phase. The processing unit is specifically configured to determine the phase noise based on the values of the K PTRSs in the third signal, the preset receiving values of the K PTRSs in the first signal, and the second parameter.

According to a fifth aspect, this application provides another communication apparatus, including a processor, where the processor is coupled to a memory. The memory is configured to store program code. The processor is configured to invoke the program code from the memory to perform the method described in the first aspect or any possible implementation of the first aspect, or perform the method described in the second aspect or any possible implementation of the second aspect.

According to a sixth aspect, this application provides another communication apparatus. The communication apparatus includes a logic circuit and an input/output interface. The input/output interface is configured to input a first signal, and the input/output interface is further configured to output a second signal. The logic circuit is configured to process the first signal and the second signal, and perform the method described in the first aspect or any possible implementation of the first aspect.

According to a seventh aspect, this application provides another communication apparatus. The communication apparatus includes a logic circuit and an input/output interface. The input/output interface is configured to input a third signal. The logic circuit is configured to process the third signal, and perform the method described in the second aspect or any possible implementation of the second aspect.

According to an eighth aspect, this application provides a computer-readable storage medium. The computer-readable storage medium is configured to store instructions. When the instructions are executed, the method described in the first aspect or any possible implementation of the first aspect is implemented, or the method described in the second aspect or any possible implementation of the second aspect is implemented.

According to a ninth aspect, this application provides a computer program product. The computer program product includes a computer program or instructions. When the computer program or the instructions are run on a computer, the computer is enabled to perform the method described in the first aspect or any possible implementation of the first aspect, or perform the method described in the second aspect or any possible implementation of the second aspect.

In embodiments of this application, the transmit end of the signal may preprocess the values of the K PTRSs in the first signal, so that under the assumed condition that there is no phase noise, the value of the PTRS received by the receive end of the signal may be determined based on the preset receiving value agreed on in advance, to eliminate the impact of the inter-symbol interference on the value of the PTRS. Because the values of the K PTRSs in the third signal actually received by the receive end are further affected by the phase noise, the receive end may calculate the phase noise by using the actual received values and the preset receiving values of the K PTRSs.

BRIEF DESCRIPTION OF DRAWINGS

To describe technical solutions in embodiments of this application or in the prior art more clearly, the following briefly describes the accompanying drawings required for describing embodiments or the prior art.

DESCRIPTION OF EMBODIMENTS

The following describes in detail technical solutions in embodiments of this application.

Terms used in the following embodiments of this application are merely intended to describe particular embodiments, but are not intended to limit this application. The terms "one", "a" and "the" of singular forms used in this specification and the appended claims of this application are also intended to include plural forms, unless otherwise specified in the context clearly. It should be further understood that, the term "and/or" used in this application indicates and includes any or all possible combinations of one or more listed items.

It should be further understood that, "first", "second", "third", "fourth", and various numbers in this specification are merely used for differentiation for ease of description, and are not intended to limit the scope of embodiments of this application.

Figure 1:
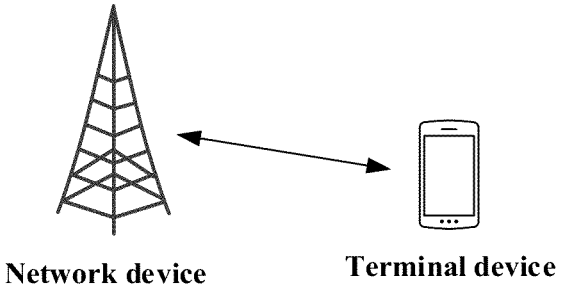
FIG. 1 is a schematic diagram of a network architecture according to an embodiment of this application.

Embodiments of this application may be applied to a network architecture shown in FIG. 1. The network architecture shown in FIG. 1 is a network architecture of a wireless communication system. The network architecture usually includes a terminal device and a network device. A quantity and a form of each device constitute no limitation on embodiments of this application. In embodiments of this application, the terminal device and the network device may communicate with each other by using a single carrier.

It should be noted that the wireless communication system mentioned in embodiments of this application includes but is not limited to an Internet of Things (IoT) system, a long term evolution (LTE) system, a 5th-generation (5G) mobile communication system, a 6th-generation (6G) mobile communication system, and a future mobile communication system. In some embodiments, the technical solutions in embodiments of this application may be further applied to a wireless local area network (WLAN) network, may be further applied to a Vehicle-to-X (V2X) network, may be further applied to a non-terrestrial network (NTN), a satellite and high-altitude platform (HAP), or enhanced Internet of Things (LTE enhanced MTO, eMTC), or may be applied to another network or the like. In some other embodiments, the technical solutions in embodiments of this application may be further applied to a communication system with radar communication integration, a terahertz, and a higher frequency, and the like. This is not specifically limited in this application.

The network device in embodiments of this application may be a base station (BS). The base station may provide communication services for a plurality of terminal devices, or a plurality of base stations may provide communication services for a same terminal device. The base station in embodiments of this application is an apparatus that is deployed in a radio access network and that is configured to provide a wireless communication function for the terminal device. The base station device may be a base station, a relay station, or an access point. The base station may be an eNB or an eNodeB (Evolutional NodeB) in long term evolution (LTE). Alternatively, the base station device may be a radio controller in a cloud radio access network (CRAN) scenario. Alternatively, the base station device may be a base station device in a future 5G network or a network device in a future evolved PLMN network. Alternatively, the base station device may be a wearable device, a vehicle-mounted device, or the like. In embodiments of this application, an apparatus configured to implement a function of the network device may be a network device, or may be an apparatus that can support the network device in implementing the function, for example, a chip system. The apparatus may be installed in the network device.

The terminal device in embodiments of this application may also be referred to as a terminal, and may be a device with a wireless transceiver function. The terminal device in embodiments of this application may include various user equipment (UE), access terminals, UE units, UE stations, mobile stations, remote stations, remote terminals, mobile devices, UE terminals, terminals, wireless communication devices, UE agents, UE apparatuses, or the like that have a wireless communication function. The access terminal may be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, an unmanned aerial vehicle (or referred to as a drone for short) (UAV), a vehicle-mounted device, a wearable device, a terminal device in a future 5G network, a terminal device in a future evolved PLMN network, or the like. In embodiments of this application, an apparatus configured to implement a function of the terminal may be a terminal, or may be an apparatus that can support the terminal in implementing the function, for example, a chip system. The apparatus may be installed in the terminal. In embodiments of this application, the chip system may include a chip, or may include a chip and another discrete component.

Embodiments of this application may be applied to a device to device (D2D) system, a machine to machine (M2M) system, a vehicle to everything (V2X) system in which a vehicle communicates with anything, or the like.

Embodiments of this application may be applied to a next-generation microwave scenario, an NR-based microwave scenario, a backhaul (integrated access backhaul, IAB) scenario, or the like.

Embodiments of this application may be applied to an uplink transmission scenario, that is, a scenario in which a terminal device sends an uplink signal to a network device; or may be applied to a downlink transmission scenario, that is, a scenario in which a network device sends a downlink signal to a terminal device.

The network architecture and a service scenario described in embodiments of this application are intended to describe the technical solutions in embodiments of this application more clearly, and do not constitute any limitation on the technical solutions provided in embodiments of this application. A person of ordinary skill in the art may know that with evolution of the network architecture and emergence of a new service scenarios, the technical solutions provided in embodiments of this application are also applicable to similar technical problems.

The following describes some concepts in embodiments of this application.

(1) Peak-to-Average Power Ratio (PAPR)

In the time domain, a radio signal is a sine wave with a changing amplitude. The amplitude is not constant. A peak signal amplitude in one period is different from that in another period. Therefore, average power and peak power in each period are different. In a long period, the peak power is the maximum transient power that occurs with a specific probability. The probability is usually 0.01% (that is, $10^{-4}$). Under this probability, a ratio of the peak power to total average power of a system is the PAPR.

Power amplification needs to be performed on a signal of a wireless communication system before the signal is sent to a remote location. Due to the limitations of a technology and equipment costs, one power amplifier usually linearly amplifies in only one range. If the range is exceeded, signal distortion occurs. The signal distortion causes a receive end of the received signal to be unable to correctly parse the signal. To ensure that a peak value of the signal is still within a linear range that the power amplifier can normally amplify power, average power of the transmitted signal needs to be reduced. In this manner, the efficiency of the power amplifier is low, or equivalently, a coverage area becomes smaller.

Because a signal of orthogonal frequency division multiplexing (OFDM) on one carrier is represented as a sinc function, there is tailing on left and right sides. In a specific probability, tailing of a plurality of carriers may be superimposed at a distance to form a point with large peak power. In other words, using an OFDM waveform easily causes a problem of an excessively high PAPR.

(2) Single Carrier

The single carrier has a lower PAPR than the OFDM waveform, and the present invention considers a scenario in which data is transmitted by using a single carrier-based waveform. The single carrier includes but is not limited to the following waveforms: a single carrier-quadrature amplitude modulation (SC-QAM) waveform, a single carrier-offset quadrature amplitude modulation (SC-OQAM) waveform, a DFT-s-OFDM waveform, a single carrier transform spread-based orthogonal frequency division multiplexing (DFT-s-OFDM with FTSS) waveform that carries a DFT-s-OFDM signal with a real and imaginary part separation, a DFT-s-OFDM signal of a pulse amplitude modulation (PAM) constellation, a DFT-s-OFDM signal that is of an addition filter and that carries a real and imaginary part separation, and a DFT-s-OFDM signal of a PAM constellation addition filter, a unique word discrete Fourier transform spread orthogonal frequency division multiplexing (uw-DFT-s-OFDM) waveform, a uw-DFT-s-OFDM with frequency domain truncation and spectrum shaping (uw-DFT-s-OFDM with FTSS) waveform that carries a uw-DFT-s-OFDM signal with a real and imaginary part separation, a uw-DFT-s-OFDM signal of a pulse amplitude modulation constellation, a uw-DFT-s-OFDM signal that is of an addition filter and that carries a real and imaginary part separation, and a uw-DFT-s-OFDM signal of a PAM constellation addition filter, a zero tail discrete Fourier transform spread orthogonal frequency division multiplexing (zt-DFT-s-OFDM) waveform, a zt-DFT-s-OFDM with frequency domain truncation and spectrum shaping (zt-DFT-s-OFDM with FTSS) waveform that carries a zt-DFT-s-OFDM signal with a real and imaginary part separation, a zt-DFT-s-OFDM signal of a pulse amplitude modulation constellation, a zt-DFT-s-OFDM signal that is of an addition filter and that carries a real and imaginary part separation, and a zt-DFT-s-OFDM signal of a PAM constellation addition filter, and the like.

The DFT-s-OFDM is a single-carrier waveform technology based on an OFDM implementation architecture. Compared with the OFDM waveform, the DFT-s-OFDM waveform provides higher output power and higher power amplification efficiency at same power amplification, so that coverage can be improved and energy consumption can be reduced.

Currently, in a long term evolution (LTE) system and a 5th-generation (5G) (or referred to as a new radio (NR)) communication system, the DFT-s-OFDM waveform may be used in uplink transmission. However, in high frequency communication, a PAPR problem is severe due to a limited device capability. Therefore, the DFT-s-OFDM waveform may also be used in downlink transmission in the future. A frequency band of the high frequency communication may be 24250 MHz to 52600 MHz in the NR system, may be a frequency band above 52600 MHz supported by a subsequently evolved NR system, or may be a higher frequency band of a next generation communication system, for example, a terahertz (THz) frequency band.

In the DFT-s-OFDM technology, additional discrete Fourier transform (DFT) processing is performed before an OFDM processing process. Therefore, the DFT-s-OFDM technology may also be referred to as a linear precoding OFDM technology.

Figure 2:
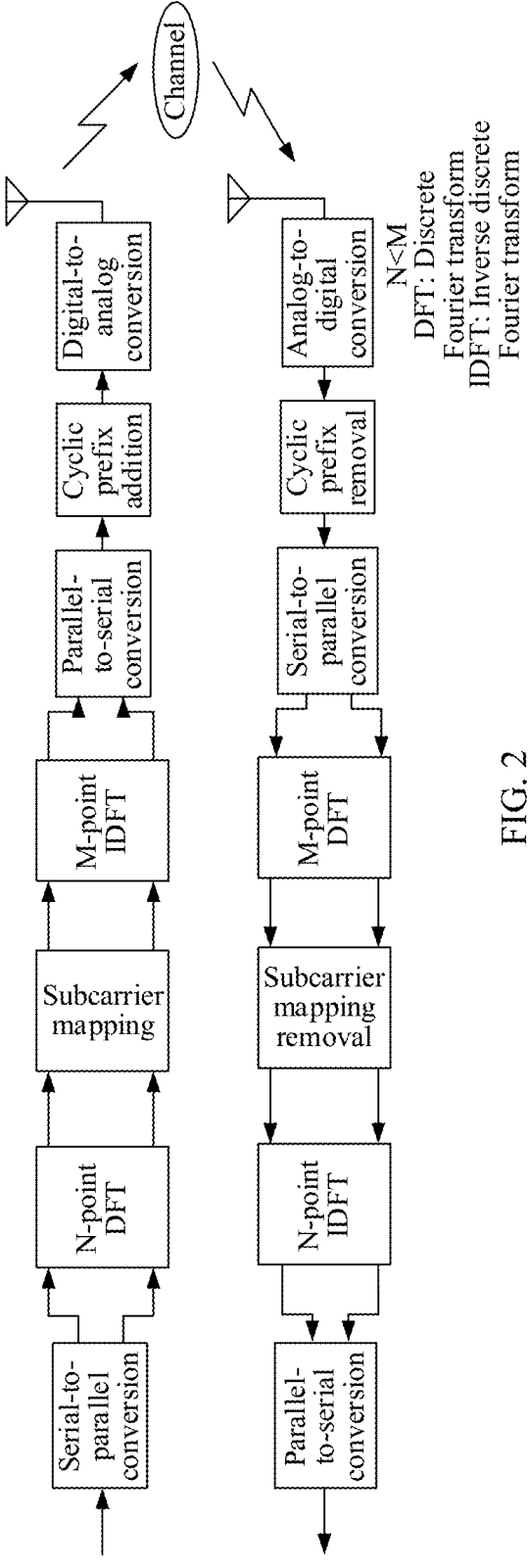
FIG. 2 is a schematic diagram of a processing procedure of a DFT-s-OFDM technology according to an embodiment of this application.

FIG. 2 is a schematic diagram of a processing procedure of a DFT-s-OFDM technology according to an embodiment of this application. A transmit end sequentially performs processing, for example, serial-to-parallel conversion, N-point discrete Fourier transform (DFT), subcarrier mapping, M-point inverse discrete Fourier transform (IDFT), parallel-to-serial conversion, cyclic prefix (CP) addition, and digital-to-analog conversion (DAC) on a time domain discrete sequence, and then sends a signal through an antenna port and a channel. When receiving a signal through the channel and the antenna port, a receive end sequentially performs analog-to-digital conversion (ADC), cyclic prefix removal, serial-to-parallel conversion, M-point DFT, subcarrier mapping removal, N-point IDFT, and parallel-to-serial conversion on the signal, to obtain a time domain discrete sequence.

The transmit end may obtain a frequency domain sequence of the time domain discrete sequence through the N-point DFT. After the subcarrier mapping is performed on the frequency domain sequence, the IDFT is input to perform the M-point IDFT, where N<M. Because a length of the IDFT is greater than a length of the DFT, a part that is in the IDFT and in which the length of the IDFT exceeds the length of the DFT is input with zero for padding. After the IDFT, the cyclic prefix is added to avoid symbol interference.

Compared with OFDM, the DFT-s-OFDM has a lower PAPR. This can improve power transmission efficiency of a mobile terminal, prolong battery life, and reduce terminal costs.

(3) ORTHOGONAL FREQUENCY DIVISION MULTIPLEXING WITH FREQUENCY DOMAIN SPECTRUM Shaping (Discrete Fourier Transform Spread Orthogonal Frequency Division Multiplexing with Frequency Domain Spectrum Shaping, DFT-s-OFDM with FDSS)

A DFT-s-OFDM with FDSS waveform is a special DFT-s-OFDM waveform. Compared with the DFT-s-OFDM, the DFT-s-OFDM with FDSS technology adds a frequency domain spectrum shaping operation.

Figure 3:
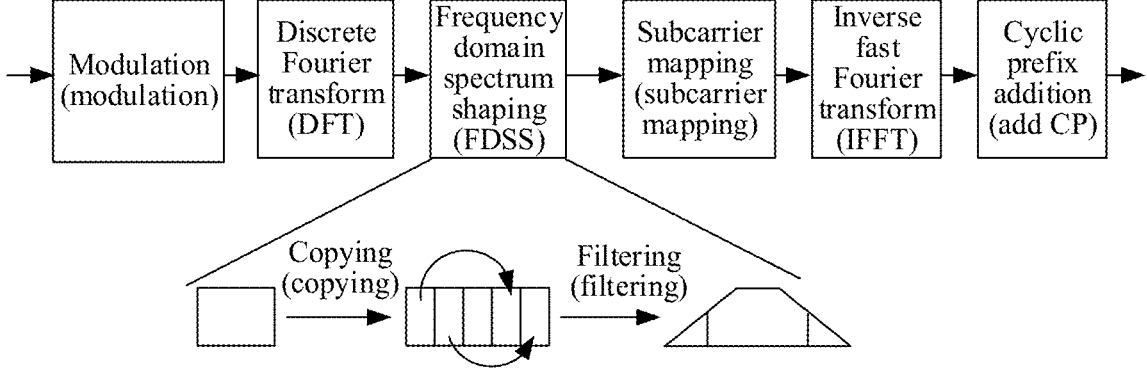
FIG. 3 is a schematic diagram of a processing procedure of a DFT-s-OFDM with FDSS technology according to an embodiment of this application.

FIG. 3 is a schematic diagram of a processing procedure of a DFT-s-OFDM with FDSS technology according to an embodiment of this application. A transmit end sequentially performs operations such as discrete Fourier transform (DFT), frequency domain spectrum shaping (FDSS), subcarrier mapping, inverse fast Fourier transform (IFFT), and cyclic prefix (CP) addition on a modulated signal.

In this process, it can be seen that, in the DFT-s-OFDM with FDSS technology, an additional spectrum replication is performed after the DFT, and then one filter is used for processing the replicated signal, to achieve a frequency domain spectrum shaping effect. Because the frequency domain spectrum shaping is performed, it is equivalent to that a waveform in time domain changes from a DFT-s-OFDM Sinc waveform to another waveform with a more limited time length/lower sideband envelope. Therefore, a PAPR of the DFT-s-OFDM waveform is further reduced. This is an alternative waveform technology in future mobile communication (6G+) and high frequency scenarios.

(4) Filter

The filter is a filter circuit including a capacitor, an inductor, and a resistor. The filter may effectively filter out a frequency of a specific frequency or a frequency other than the frequency in a power cable, to obtain a signal of a specific frequency or a signal obtained through elimination of a specific frequency. Based on a frequency selection function of the filter, interference noise in the signal can be filtered out or spectrum analysis can be performed.

The Filter may be mainly classified into a Nyquist filter and a non-Nyquist filter based on whether there is inter-symbol interference (ISI).

The Nyquist filter is defined as follows: if a waveform of a previous code element is attenuated to 0 at a determining moment of a next code element, transmission can be performed without elimination of the inter-symbol interference. This filter is referred to as the Nyquist filter. Correspondingly, a filter that has no foregoing characteristic may be collectively referred to as the non-Nyquist filter.

Figure 4:
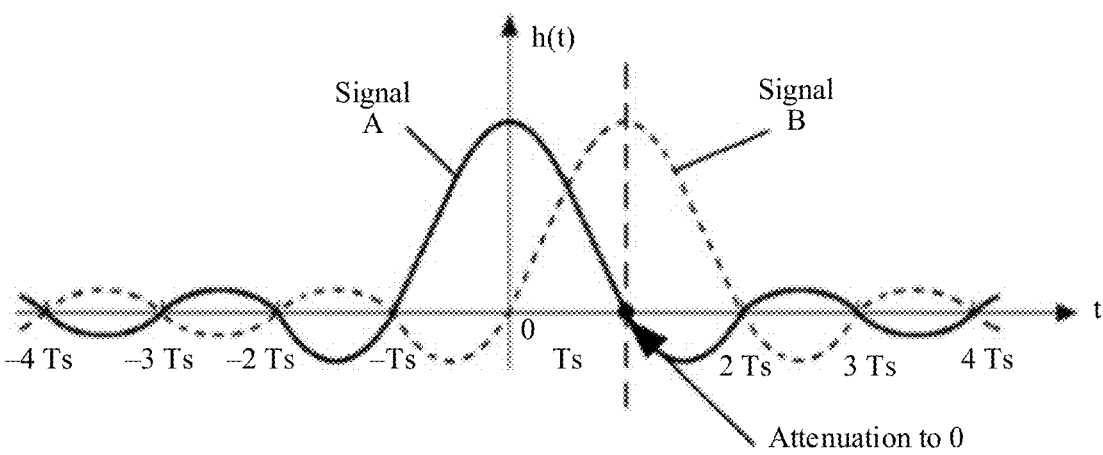
FIG. 4 is a schematic diagram of a processed signal in a Nyquist filter according to an embodiment of this application.

FIG. 4 is a schematic diagram of a processed signal in a Nyquist filter according to an embodiment of this application. In FIG. 4, a signal A is a signal preceding a signal B, and at a determining moment (Ts) of the signal B, the signal A has been attenuated to 0. In other words, the signal A does not affect the signal B, and there is no inter-symbol interference between the signal A and the signal B.

Figure 5:
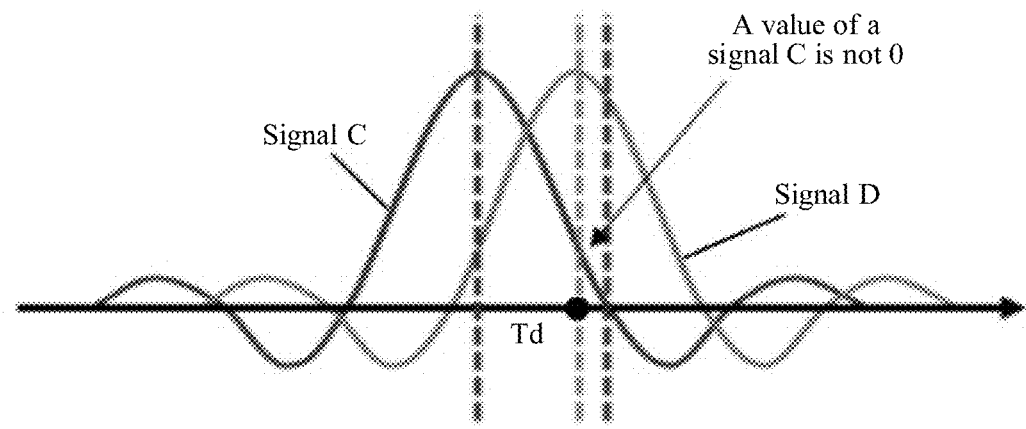
FIG. 5 is a schematic diagram of a processed signal in a non-Nyquist filter according to an embodiment of this application.

FIG. 5 is a schematic diagram of a processed signal in a non-Nyquist filter according to an embodiment of this application. In FIG. 5, a signal C is a signal preceding a signal D, and at a determining moment (Td) of the signal D, a value of the signal C is not 0. In other words, the signal C affects the signal D, and there is inter-symbol interference between the signal C and the signal D.

However, for the DFT-s-OFDM with FDSS waveform, the Nyquist filter is not a choice of optimal performance. For example, to further reduce the peak-to-average power ratio in the high frequency communication, a filter that meets a sideband envelope variance minimization criterion and that has an optimal PAPR may be designed. Usually, the filter designed in this way is a non-Nyquist filter.

Compared with the Nyquist filter, the non-Nyquist filter can reduce a PAPR of a signal. In addition, the non-Nyquist filter may be designed to have better frequency domain flatness than the Nyquist filter, to have better channel estimation performance. Alternatively, the non-Nyquist filter may be designed to have higher-energy tailing than the Nyquist filter, to have better performance at a tailing signal. It can be seen that the non-Nyquist filter is an excellent high-frequency signal filter.

(5) Phase Noise (PN)

The phase noise is a random change of a phase of an output signal of a communication device when the communication device (for example, various radio frequency components) that sends a signal are affected by various noise. To meet increasing communication requirements, in a communication system, a frequency band resource of a high frequency (a frequency band higher than 6 GHz, mainly including 28 GHz, 39 GHz, 60 GHz, 73 GHz, and the like) is increasingly used to transmit a signal. The high frequency may provide an antenna array with high bandwidth and high integration for communication to achieve high throughput. However, a phase noise problem of the high frequency band is excessively prominent. As the frequency band increases, a higher phase noise power spectral density indicates a greater impact on a received signal. When a frequency band of the sent signal is high, deterioration of phase noise causes poor de-modulation performance of the signal and reduces communication quality. To estimate and compensate for the phase noise of the signal, a phase-tracking reference signal (phase-tracking reference signal, PTRS) is introduced in this field.

For example, for impact of the phase noise, refer to Formula 1-1:

$$y(n)=x(n)e^{j\Theta_n} \qquad \text{Formula 1-1}$$

n=0, 1, . . . , N-1, and is a time domain sampling point. Simply speaking, the phase noise is a random phase value generated at each sampling point n. A basic principle of phase noise estimation by using the PTRS is that a known PTRS (that is, known x(n)) is placed at a transmit end, a received PTRS (that is, known y(n)) is read at a receive end, and a phase noise value (that is, a value 6) may be calculated based on x(n) and y(n).

However, because the non-Nyquist filter introduces inter-symbol interference of adjacent code elements in the signal, the phase noise calculated by using the foregoing Formula 1-1 actually further includes the impact of the inter-symbol interference, and the phase noise cannot be effectively determined. This causes the poor de-modulation performance of the signal and reduces the communication quality. In view of this, the solutions in embodiments of this application are provided. In embodiments of this application, the signal receive end processes the signal by using the non-Nyquist filter.

Figure 6:
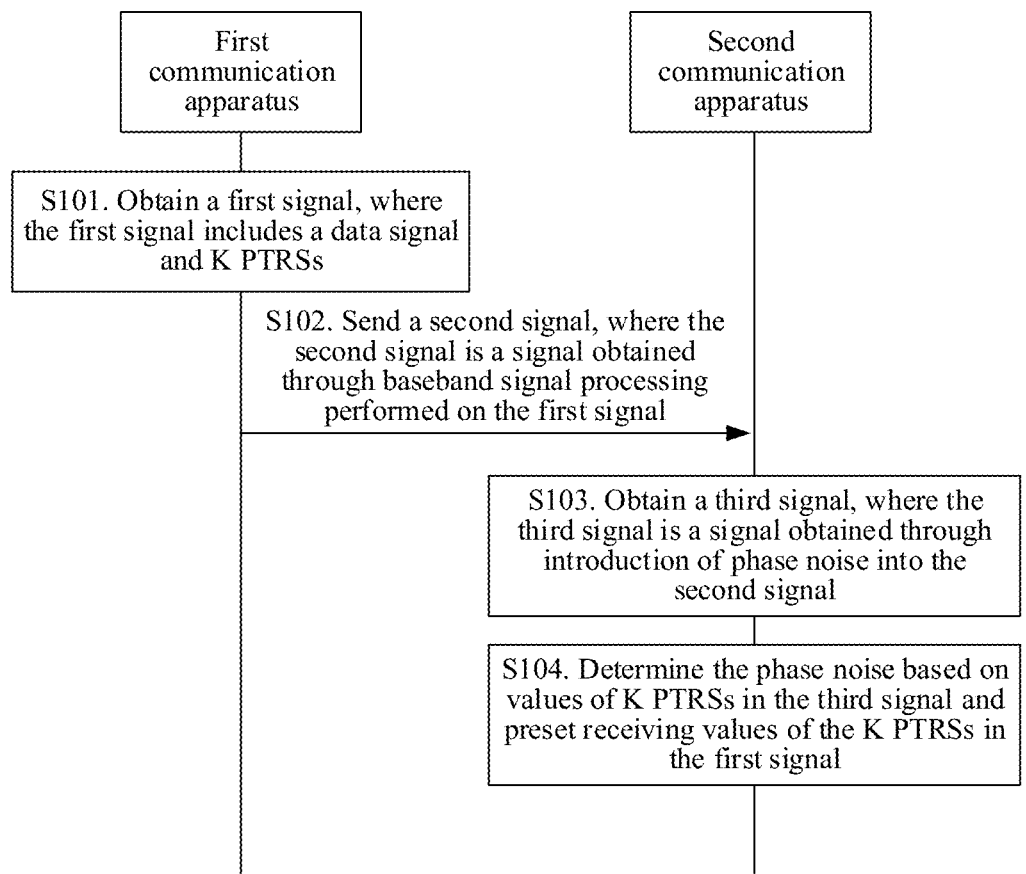
FIG. 6 is a flowchart of a phase noise determining method according to an embodiment of this application.

The following describes a phase noise determining method provided in embodiments of this application based on the network architecture, the terminal device, and the network device that are described in the foregoing content. FIG. 6 is a flowchart of a phase noise determining method according to an embodiment of this application. The method may be implemented based on the network architecture shown in FIG. 1. In an implementation, a first communication apparatus may be the network device in FIG. 1, and a second communication apparatus may be the terminal device in FIG. 1. In another implementation, the first communication apparatus may be the terminal device in FIG. 1, and the second communication apparatus may be the network device in FIG. 1. The method includes the following steps.

S101. The first communication apparatus obtains a first signal.

In a possible implementation, the first communication apparatus may generate the first signal by the first communication apparatus, and the first communication apparatus may alternatively receive the first signal from another communication apparatus. In a possible implementation, the first communication apparatus may alternatively generate a part of the first signal, and receive a part of the first signal from another communication apparatus. For example, the first communication apparatus may receive a data signal sent by the other communication apparatus to the first communication apparatus, and the first communication apparatus generates M phase-tracking reference signals (PTRSs) based on the data signal.

In this embodiment of this application, the first signal may be a DFT-s-OFDM signal. Optionally, the first signal includes one or more DFT-s-OFDM signals, one DFT-s-OFDM signal includes at least one block-phase-tracking reference signal (Block-PTRS) pattern, and one DFT-s-OFDM signal includes a data signal and K PTRSs.

Optionally, the DFT-s-OFDM signal may be at least one of the following signals: an orthogonal frequency division multiplexing with frequency domain spectrum shaping DFT-s-OFDM with FDSS signal, a single carrier-quadrature amplitude modulation (single carrier-quadrature amplitude modulation, SC-QAM) signal based on a non-Nyquist filter, a DFT-s-OFDM signal based on a non-Nyquist filter, a DFT-s-OFDM with frequency domain spectrum shaping (DFT-s-OFDM with FDSS) signal based on a non-Nyquist filter, a uw-DFT-s-OFDM signal based on an addition filter of a non-Nyquist filter, a zero tail discrete Fourier transform spread orthogonal frequency division multiplexing (zero tail discrete Fourier transform spread OFDM, zt-DFT-s-OFDM) signal based on a non-Nyquist filter, a zt-DFT-s-OFDM with frequency domain spectrum shaping (zt-DFT-s-OFDM with FDSS) signal based on a non-Nyquist filter, and the like.

Figure 7:
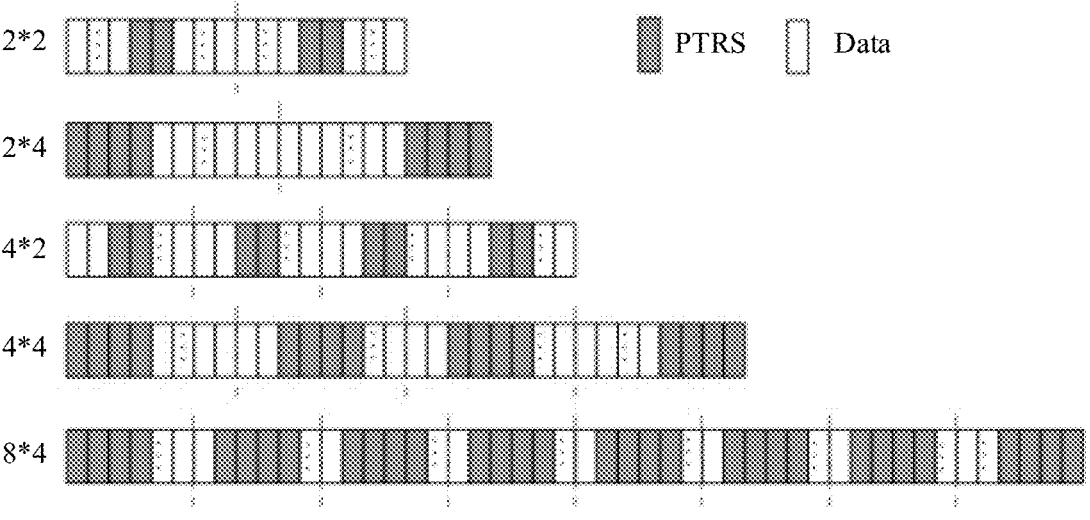
FIG. 7 is a schematic diagram of Block-PTRSs of some DFT-s-OFDM signals according to an embodiment of this application.

For example, FIG. 7 is a schematic diagram of Block-PTRSs of some DFT-s-OFDM signals according to an embodiment of this application. In FIG. 7, each grid represents one sampling point (or referred to as a quadrature amplitude modulation (QAM) symbol, a pi/2 binary phase shift keying (BPSK) symbol, or a quadrature phase shift keying (QPSK) symbol). A parameter (that is, 2*2, 2*4, 4*2, 4*4, 8*4) of a Block-PTRS pattern indicates a quantity P of PTRS groups in one DFT-s-OFDM signal and a quantity Q of sampling points in the group, that is, a total quantity of PTRSs is P*Q. It should be noted that a specific mapping location of the PTRS is related to the two parameters and scheduled bandwidth.

When the quantity Q of sampling points in the group is 2, the scheduled bandwidth is evenly divided into P segments or P intervals, and one PTRS group is mapped to a middle of each segment, as shown in a first row and a third row in FIG. 4. When the quantity Q of sampling points in the group is 4, the scheduled bandwidth is evenly divided into P segments or P intervals, and then one PTRS group is mapped to each segment or interval, where a PTRS group of a first segment is mapped to a header of the first segment, a PTRS group of a $P^{th}$ segment is mapped to a tail of the $P^{th}$ segment, and a PTRS group of another segment (or referred to as an interval) is mapped to the middle, as shown in a second row (because there are only two segments in this case, there is no PTRS group mapped to the middle of the segment), a fourth row, and a fifth row in FIG. 4.

In a transmission process, the foregoing two parameters are implicitly determined based on current scheduled bandwidth NR and a preconfigured mapping relationship (a correspondence between the scheduled bandwidth and the parameter, as shown in Table 1, where $N_{RB0}$ to $N_{RB4}$ are preconfigured values).

TABLE 1

| Scheduled bandwidth (Scheduled bandwidth) | Quantity of PTRS groups (Number of PTRS groups) | Quantity of sampling points per PTRS group (Number of samples per PTRS group) |
|---|---|---|
| $N_{RB0} \le N_{RB} < N_{RB1}$ | 2 | 2 |
| $N_{RB1} \le N_{RB} < N_{RB2}$ | 2 | 4 |
| $N_{RB2} \le N_{RB} < N_{RB3}$ | 4 | 2 |
| $N_{RB3} \le N_{RB} < N_{RB4}$ | 4 | 4 |
| $N_{RB4} \le N_{RB}$ | 8 | 4 |

Optionally, the first signal in this embodiment of this application may be the DFT-s-OFDM signal generated based on the foregoing location mapping manner of the PTRS and the data signal. Optionally, the location mapping of the PTRS and the data signal in the first signal may be alternatively performed in another manner. This is not limited in this embodiment of this application.

The foregoing content describes the location mapping manner of the PTRS in the first signal. The following specifically describes a manner of determining a value of the PTRS in the first signal in this embodiment of this application.

Specifically, the first signal includes a data signal and K phase-tracking reference signals PTRSs. A value of an $m^{th}$ PTRS in the K PTRSs is determined based on a value of first interference, a value of second interference, and a preset receiving value of the $m^{th}$ PTRS, the first interference is inter-symbol interference generated by the data signal on the $m^{th}$ PTRS, the second interference is inter-symbol interference generated by a PTRS other than the $m^{th}$ PTRS in the K PTRSs on the $m^{th}$ PTRS, K and m are positive integers, and $1 \le m \le K$.

The value of the PTRS includes an amplitude and a phase of the PTRS. It should be noted that the $m^{th}$ PTRS may be any one of the K PTRSs. A preset receiving value of the PTRS is agreed on by the first communication apparatus and the second communication apparatus in advance. In other words, both the first communication apparatus and the second communication apparatus know the preset receiving value of the PTRS.

In this manner, the first communication apparatus preprocesses the values of the K PTRSs, so that under an assumed condition that there is no phase noise, a value of a PTRS received by a receive end (that is, the second communication apparatus) may be determined based on the preset receiving value agreed on in advance, to eliminate any impact of inter-symbol interference on the value of the PTRS. It should be noted that the value of the PTRS actually received by the receive end is not equal to the preset receiving value because there is further impact of phase noise. An objective of this solution is to eliminate the impact of the inter-symbol interference on the value of the PTRS. In this way, the phase noise may be calculated based on the actual receiving value and the preset receiving value of the PTRS.

In a possible implementation, a sum of the value of the $m^{th}$ PTRS, the value of the first interference, and the value of the second interference is equal to the preset receiving value of the mt PTRS. For example, for a relationship between the value of the PTRS in the first signal and the preset receiving value of the PTRS, refer to Formula 1-2. In this example, the first signal includes N data signals.

Formula 1-2

$$
\begin{cases}
\tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) = S(m), \; m = 1 \\[2ex]
\tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) = S(m), \; m = 2 \\[2ex]
\cdots \\[1ex]
\tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) = S(m), \; m = K
\end{cases}
$$

$\tilde{S}_{PTRS}(m)$ is the value of the $m^{th}$ PTRS in the first signal, and $$
\sum_{n=1}^{N} ISI_{Data_n}(m)
$$

is the inter-symbol interference, that is, the first interference, generated by the N data signals on the $m^{th}$ PTRS.

$$
\sum_{\substack{m'=1 \\ m' \neq m}}^{K} ISI_{PTRS_{m'}}(m)
$$

is the inter-symbol interference, that is, the second interference, generated by the PTRS other than the $m^{th}$ PTRS in the K PTRSs on the $m^{th}$ PTRS. S(m) is the preset receiving value of the mt PTRS. The value m is an index value (or referred to as a sequence number, a number, a label, or the like) of the PTRS. It should be noted that the index value of the PTRS may alternatively be designed starting from 0. In this case, a value of the $1^{st}$ PTRS is represented as $\tilde{S}_{PTRS}(0)$. In addition, there may be another index value design manner. The design manner of the index value is not limited in this embodiment of this application.

For the first communication apparatus, values of the N data signals and preset receiving values of the K PTRSs are known. There are K PTRS signals in the first signal. Therefore, there are a total of K unknown numbers $\tilde{S}_{PTRS}(m)$s and K equations in Formula 1-2. The K equations may be solved to obtain $\tilde{S}_{PTRS}(m)$, that is, the value of each PTRS.

In a possible implementation, a preset interference value or an interference calculation formula may be further added to a left part of Formula 1-2, to compensate for other interference received by a signal in a transmission process.

It should be noted that, in this embodiment of this application, the value of the first interference and the value of the second interference may be determined based on a type of a receiver. For example, the type of the receiver may include a matched filtering receiver, a rectangular window receiver, an RC receiver, and the like. The first communication apparatus may determine, based on the type of the receiver, a calculation method (for example, may be a calculation formula) for calculating the inter-symbol interference (ISI). Expressions of the specific value of the first interference and the value of the second interference may be obtained based on the calculation manner, the values of the N data signals, and the K $\tilde{S}_{PTRS}(m)$s. Then, the expressions of the value of the first interference and the value of the second interference are substituted into Formula 1-2 for calculation, and values of the K $\tilde{S}_{PTRS}(m)$ s may be obtained through calculation.

In a possible implementation, the type of the receiver may be determined by the second communication apparatus. Optionally, the type of the receiver may be a type of a receiver that is disposed on the second communication apparatus and that is configured to receive a signal. It should be noted that the type of the receiver may be another type.

In this case, optionally, before the first communication apparatus obtains the first signal, the method further includes: The first communication apparatus obtains first indication information sent by the second communication apparatus, where the first indication information indicates the type of the receiver. For example, a manner in which the first communication apparatus obtains the first indication information may be that the first communication apparatus receives the first indication information sent by the second communication apparatus, or the first communication apparatus sends a request for requesting the first indication information to the second communication apparatus, and then receives the first indication information sent by the second communication apparatus in response to the request. In this manner, the first communication apparatus may process the first signal based on the type of the receiver indicated by the first indication information.

In another possible implementation, the type of the receiver may alternatively be determined by the first communication apparatus. Optionally, the type of the receiver may be a type of a receiver that is disposed on the first communication apparatus and that is configured to receive a signal. It should be noted that the type of the receiver may be another type.

In this case, optionally, the method further includes: The first communication apparatus sends second indication information to the second communication apparatus, where the second indication information indicates the type of the receiver. Correspondingly, the second communication apparatus obtains the second indication information sent by the first communication apparatus. For example, the first communication apparatus may first receive a request that is sent by the second communication apparatus and that is for requesting the second indication information, and in response to the request, the first communication apparatus sends the second indication information to the second communication apparatus.

It should be noted that the first communication apparatus may send the second indication information to the second communication apparatus before sending a second signal, may send the second indication information to the second communication apparatus after sending the second signal, or may send the second indication information to the second communication apparatus when sending the second signal. An occasion at which the first communication apparatus sends the second indication information is not limited in this embodiment of this application. In this manner, the first communication apparatus may notify the second communication apparatus of the type of the receiver based on which the first signal is generated.

S102. The first communication apparatus sends the second signal to the second communication apparatus, where the second signal is a signal obtained through baseband signal processing performed on the first signal.

After baseband signal processing, the first signal may be sent to the second communication apparatus through an antenna.

Figure 8:
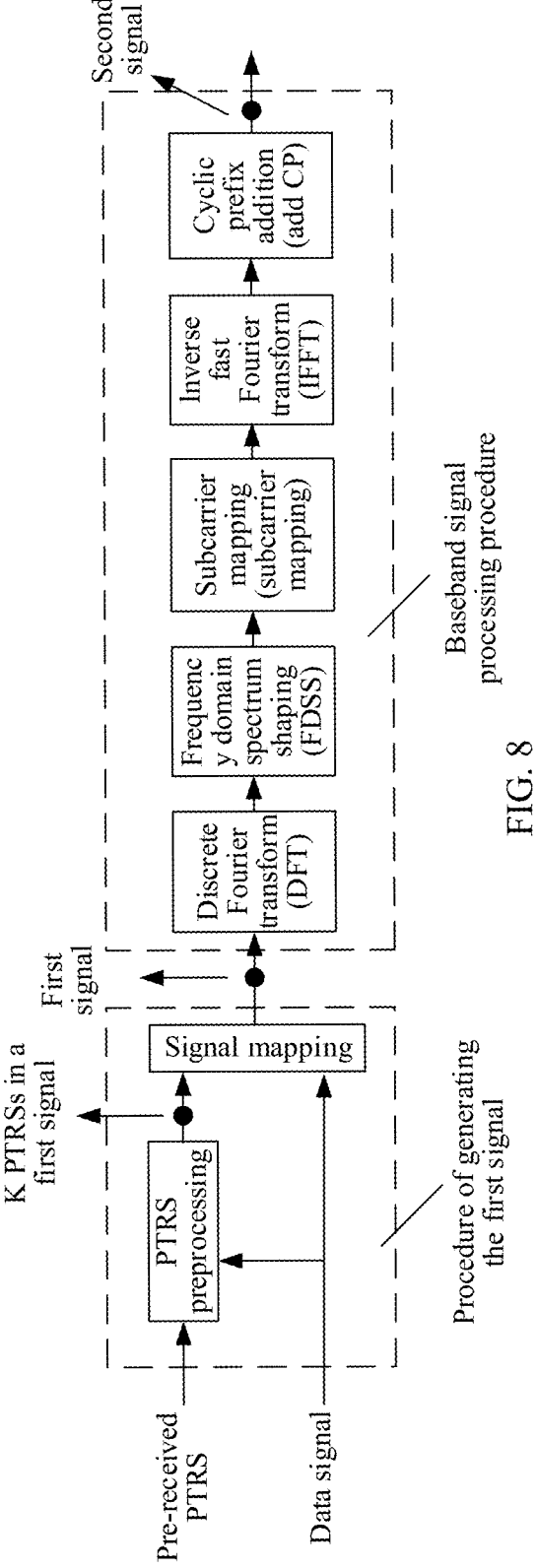
FIG. 8 is a schematic flowchart of generating a second signal by a first communication apparatus according to an embodiment of this application.

For example, FIG. 8 is a schematic flowchart of generating a second signal by a first communication apparatus according to an embodiment of this application. First, the first communication apparatus performs PTRS preprocessing on a pre-received PTRS (which may be understood as a PTRS whose value is a preset receiving value) and a data signal, to obtain K PTRSs in a first signal. Then, the first communication apparatus performs signal mapping on the K PTRSs and the data signal, to generate the first signal. Specifically, for a manner of determining values of the K PTRSs in the first signal and a location mapping manner of the PTRS and the data signal in the first signal, refer to the descriptions in the foregoing content. Next, the first communication apparatus performs baseband signal processing on the first signal, to obtain the second signal.

An example of a baseband signal processing procedure is as follows.

Step a1: Perform discrete Fourier transform (DFT) on the first signal to obtain a frequency domain signal f1 corresponding to the first signal.

Step b1: Perform frequency domain spectrum shaping (FDSS) on the frequency domain signal f1 to obtain a frequency domain signal f2.

Step c1: Perform subcarrier mapping on the frequency domain signal f2, and perform inverse fast Fourier transform (IFFT) on the mapped signal to obtain a time domain signal f3.

Step d1: Add a cyclic prefix (add CP) to the time domain signal f3 to obtain the second signal.

S103. The second communication apparatus obtains a third signal, where the third signal is a signal obtained through introduction of phase noise into the second signal sent by the first communication apparatus.

It may be understood that, corresponding to the second signal, the third signal also includes a data signal and K PTRSs. Due to the impact of the phase noise, values of the data signal and the K PTRSs in the third signal are different from values of a data signal and K PTRSs in the second signal.

S104. The second communication apparatus determines the phase noise based on the values of the K PTRSs in the third signal and the preset receiving values of the K PTRSs in the first signal.

A principle that the second communication apparatus may determine the phase noise based on the values of the K PTRSs in the third signal and the preset receiving values of the K PTRSs in the first signal is first described.

When the second communication apparatus processes a signal by using a non-Nyquist filter, inter-symbol interference exists in the signal, and an impact of phase noise exists in the received signal. An $m^{th}$ PTRS in the third signal is used as an example of a PTRS signal received by the second communication apparatus, and an actual receiving value of the mt PTRS may be represented by Formula 1-3:

$$x(m)e^{j\theta_m} = S(m)e^{j\theta_m} = \left( \tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) \right) e^{j\theta_m} \qquad \text{Formula 1-3}$$

$x(m)e^{j\theta_m}$ is the PTRS that is actually received by the second communication apparatus and that is affected by the phase noise ($e^{j\theta_m}$). $x(m)$ is a PTRS that should be received by the second communication apparatus in a condition without the phase noise. $S(m)$ is a preset receiving value of the $m^{th}$ PTRS. With reference to the descriptions of the foregoing content, because the impact of the inter-symbol interference has been considered for a value of $S(m)$, $x(m)$ should be equal to the preset receiving value $S(m)$. In other words, in Formula 1-3, $x(m)e^{j\theta_m}$ and $S(m)$ are known, so that the phase noise ($e^{j\theta_m}$) may be solved.

The following describes a method in which the second communication apparatus determines the phase noise based on the values of the K PTRSs in the third signal and the preset receiving values of the K PTRSs in the first signal.

In a possible implementation, before the second communication apparatus determines the phase noise based on the values of the M PTRSs in the third signal and the preset receiving values of the M PTRSs in the first signal, the second communication apparatus needs to process the third signal to obtain the values of the M PTRSs in the third signal.

Figure 9:
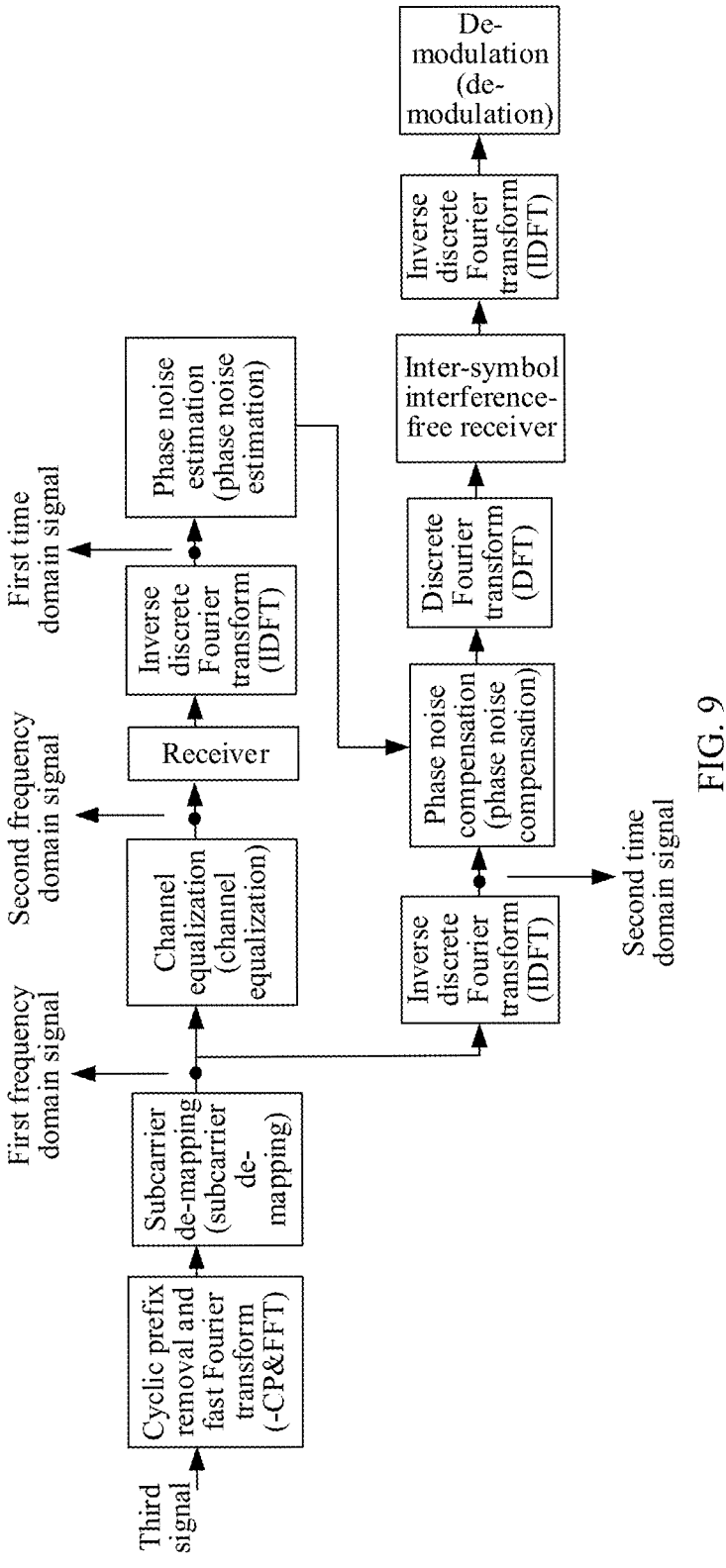
FIG. 9 is a schematic flowchart of processing a third signal by a second communication apparatus according to an embodiment of this application.

For example, FIG. 9 is a schematic flowchart of processing a third signal by a second communication apparatus according to an embodiment of this application. FIG. 9 includes a procedure in which the second communication apparatus obtains values of M PTRSs in the third signal. The procedure may include the following steps.

Step a2: The second communication apparatus converts the third signal into a first frequency domain signal.

First, the second communication apparatus performs cyclic prefix removal (-CP) processing on the third signal, then performs fast Fourier transform (FFT), and then performs subcarrier de-mapping to obtain the first frequency domain signal.

Step b2: The second communication apparatus performs channel equalization on the first frequency domain signal to obtain a second frequency domain signal.

It should be noted that channel equalization processing is performed to eliminate the impact of a channel for transmitting the third signal on the third signal.

Step c2: The second communication apparatus preprocesses the second frequency domain signal based on a receiver, and converts the processed second frequency domain signal into a first time domain signal.

The receiver is a preset or predefined receiver. Optionally, a type of the receiver is the type of the receiver indicated in the first indication information or the second indication information described in the foregoing content. In this manner, inter-symbol interference to a value of an actually received PTRS is the same as inter-symbol interference calculated in a design process of a first signal. In other words, in Formula 1-3, x(m) is equal to the preset receiving value S(m).

For example, after preprocessing the second frequency domain signal based on the receiver, the second communication apparatus performs inverse discrete Fourier transform (IDFT) on the preprocessed signal, to convert the processed second frequency domain signal into the first time domain signal.

Step d2: The second communication apparatus obtains the values of the M PTRSs in the third signal from the first time domain signal.

For example, the second communication apparatus samples the first time domain signal, and obtains the values of the M PTRSs in the third signal from the first time domain signal. Optionally, the second communication apparatus may determine a location mapping relationship between the PTRS and a data signal in the third signal based on a value of scheduled bandwidth $N_{RB}$ (refer to a mapping relationship in Table 1), sample the first time domain signal based on a determined mapping location of the PTRS, and obtain the values of the M PTRSs in the third signal from the first time domain signal. It should be noted that this manner is merely an example. For different design manners of location mapping of the PTRS and the data signal, the values of the M PTRSs in the third signal obtained by the second communication apparatus may change correspondingly. This is not limited in this embodiment of this application.

After the second communication apparatus obtains the values of the M PTRSs in the third signal, the second communication apparatus may determine the phase noise based on the values of the K PTRSs in the third signal and the preset receiving values of the K PTRSs in the first signal in the manner described in Formula 1-3.

In a possible implementation, to obtain the data signal in the original first signal from the third signal, the method may further include (refer to the procedure shown in FIG. 9): The second communication apparatus converts the first frequency domain signal into a second time domain signal. The second communication apparatus performs phase noise compensation on the second time domain signal based on the phase noise.

Optionally, after phase noise compensation, the impact of the phase noise in the third signal is removed, and then, a time domain signal on which phase noise compensation is performed may be further processed to obtain a final data signal. For example, a processing manner may be: performing discrete Fourier transform (DFT) on the time domain signal on which the phase noise compensation is performed, to convert the time domain signal into a frequency domain signal, and then processing the frequency domain signal based on an inter-symbol interference-free receiver to obtain a frequency domain signal without inter-symbol interference. Then, inverse discrete Fourier transform (IDFT) is performed on the processed frequency domain signal to convert the processed frequency domain signal into a time domain signal, and then de-modulation is performed on the signal to obtain the data signal, or a subsequent operation may be performed based on the data signal.

Due to uncertainty of the value of the data signal, the values of the K $\tilde{S}_{PTRS}$(m)s calculated by using Formula 1-2 may be inappropriate. For example, the calculated value may be excessively large, so that peak-to-average power introduced by the PTRS is large, and signal quality is affected. Alternatively, the calculated value may be excessively small, so that the PTRS is easily affected by other interference (for example, white noise). This is unfavorable to subsequent phase noise calculation based on the actual receiving value of the PTRS, and affects the determination of the phase noise. In view of this, with reference to the foregoing content, a further solution is provided, to relax a requirement on the values of the K $\tilde{S}_{PTRS}$(m)s, so that the values of the K PTRSs in the first signal are in a proper value range, and the quality of the first signal is improved.

In an embodiment, that a value of an $m^{th}$ PTRS in the K PTRSs is determined based on a value of first interference, a value of second interference, and a preset receiving value of the $m^{th}$ PTRS includes: The value of the $m^{th}$ PTRS is determined based on the value of the first interference, the value of the second interference, the preset receiving value of the $m^{th}$ PTRS, and a first parameter, where the first parameter is a value related to a signal amplitude. It should be noted that the first parameter indicates a relationship between an amplitude of the actual receiving value of the mt PTRS and that of the preset receiving value of the $m^{th}$ PTRS under the assumed condition that there is no phase noise. In this manner, the requirement on the values of the K PTRSs is relaxed by using the first parameter.

In this manner, the first communication apparatus preprocesses the values of the K PTRSs, so that under the assumed condition that there is no phase noise, the value of the PTRS received by the receive end (that is, the second communication apparatus) may be determined based on the preset receiving value agreed on in advance and the first parameter, to eliminate the impact of the inter-symbol interference on the value of the PTRS.

In a possible implementation, a sum of the value of the mt PTRS, the value of the first interference, and the value of the second interference is equal to a product of the preset receiving value of the $m^{th}$ PTRS and the first parameter. For example, for the relationship between the value of the PTRS in the first signal and the preset receiving value of the PTRS, refer to Formula 1-4. In this example, the first signal includes N data signals.

$$\begin{cases} \tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) = AS(m), \ m = 1 \\ \tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) = AS(m), \ m = 2 \\ \dots \\ \tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) = AS(m), \ m = K \end{cases}$$

Formula 1-4

$\tilde{S}_{PTRS}(m)$ is the value of the $m^{th}$ PTRS in the first signal, and $$\sum_{n=1}^{N} ISI_{Data_n}(m)$$

is the inter-symbol interference, that is, the first interference, generated by the N data signals on the $m^{th}$ PTRS.

$$\sum_{\substack{m'=1 \\ m' \neq m}}^{K} ISI_{PTRS_{m'}}(m)$$

is the inter-symbol interference, that is, the second interference, generated by the PTRS other than the $m^{th}$ PTRS in the K PTRSs on the $m^{th}$ PTRS. S(m) is the preset receiving value of the $m^{th}$ PTRS. A is the first parameter, the first parameter is the value related to the amplitude, and A may be a real number. The value m is an index value (or referred to as a sequence number, a number, a label, or the like) of the PTRS. It should be noted that the index value of the PTRS may alternatively be designed starting from 0. In this case, a value of the 1$^{st}$ PTRS is represented as $\tilde{S}_{PTRS}(0)$. In addition, there may be another index value design manner. The design manner of the index value is not limited in this embodiment of this application.

For the first communication apparatus, values of the N data signals and preset receiving values of the K PTRSs are known. There are K PTRS signals in the first signal. Therefore, there are a total of K unknown numbers $\tilde{S}_{PTRS}(m)$s and K equations in Formula 1-4. The K equations may be solved to obtain $\tilde{S}_{PTRS}(m)$, that is, the value of each PTRS.

In a possible implementation, a preset interference value or an interference calculation formula may be further added to a left part of Formula 1-4, to compensate for other interference received by a signal in a transmission process.

Figure 10:
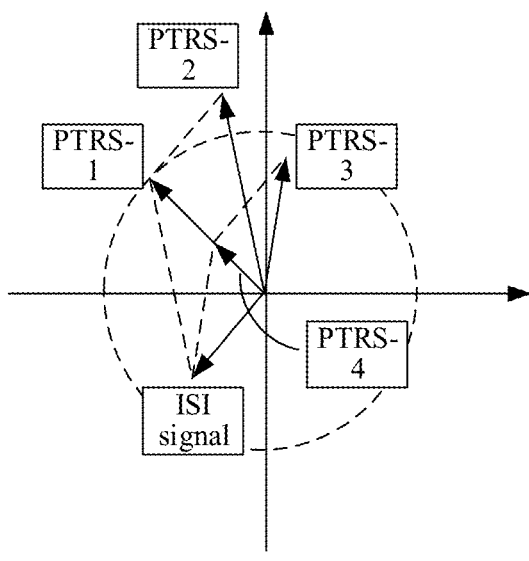
FIG. 10 is a schematic diagram of an amplitude-adjustable PTRS according to an embodiment of this application.

A principle of the foregoing method is analyzed. For example, FIG. 10 is a schematic diagram of an amplitude-adjustable PTRS according to an embodiment of this application. To make a PTRS obtained through the elimination of the impact of inter-symbol interference (for example, an ISI signal) completely equal to a preset receiving value (for example, a PTRS-1) of the PTRS, a PTRS that needs to be sent by a transmit end is a PTRS-2. The PTRS-2 requires large energy (as shown by the PTRS-2 in the figure). However, because a high-energy signal causes a PAPR increase, the PTRS-2 affects a PAPR of a system. Therefore, the PTRS sent by the transmit end may be designed as a PTRS-3, so that a phase of a signal (for example, a PTRS-4)

obtained through addition of the PTRS-4 and the ISI signal is consistent with a phase of the preset receiving value of the PTRS, but an amplitude is less than the phase of the preset receiving value. In this way, a PAPR problem caused by the high-energy signal can be alleviated.

In another example of a reverse case, an amplitude of the PTRS-2 that needs to be sent by the transmit end may be excessively small. In this case, the PTRS sent by the transmit end may be designed as a PTRS-3, so that a phase of a signal obtained through addition of the PTRS-3 and the ISI signal is consistent with a phase of the preset receiving value of the PTRS, but an amplitude is greater than the phase of the preset receiving value. In this way, anti-interference (for example, white noise) performance of the PTRS-3 sent by the transmit end can be improved.

Optionally, a value of A (that is, the first parameter) may be one of the following values: 1, 1.5, 0.5, $\sqrt{2}$, $\sqrt{10}$, $\sqrt{42}$, $\sqrt{170}$, $\sqrt{648}$, or the like. In another expression manner, a square root function (sqrt(x)=$\sqrt{x}$) is used for expressing the value of A. The value of A may be one of the following values: 1, 1.5, 0.5, sqrt(2), sqrt(10), sqrt(42), sqrt(170), sqrt(648), or the like. It should be noted that, in an actual application, the value of A may be an approximate value of these values listed above, for example, $\sqrt{2}$ may be 1.414 (or 1.41 and 1.4). In this value setting manner, an energy value of an existing constellation point is referred to for the value of the first parameter. In this value setting manner of the first parameter, signaling overheads for notifying the receive end of the first parameter can be reduced. Because the energy of the constellation point is defined in a protocol, the energy can be easily obtained. In addition, the value of the first parameter may be associated with a constellation point of a sent signal. In this way, the receive end may obtain the determined value of the first parameter based on the received signal. In addition, if the value of the first parameter comes from the constellation point (data signal selection), it can be ensured that energy of the first signal is not excessively high.

The following describes a method of determining the value of the first parameter.

The first communication apparatus may preset a value range of the K $\tilde{S}_{PTRS}(m)$. A value in the value range is not excessively large so as to cause a PAPR of the first signal to be large, and is also not excessively small to affect subsequent phase noise calculation. For example, a maximum value in the value range may not be greater than the energy of an outermost constellation point, or not greater than unit signal energy (for example, 1), or the maximum value makes the time domain signal energy generated at the PTRS not greater than maximum peak signal energy, or the like. A minimum value in the value range may be not less than 3 dB times a signal-to-noise ratio of PTRS signal de-modulation.

The first communication apparatus may select one value from a plurality of possible values of the first parameter based on a requirement of the value range. In other words, the value of the first parameter can enable the values of the K $\tilde{S}_{PTRS}$(m)s to fall within the value range.

In this implementation, the method further includes: The first communication apparatus sends third indication information to the second communication apparatus, where the third indication information indicates the first parameter. Correspondingly, the second communication apparatus obtains the third indication information sent by the first communication apparatus.

Optionally, the third indication message may include an index corresponding to the first parameter. Table 2 shows a possible correspondence between the value of the first parameter and the index according to an embodiment of this application.

TABLE 2

| Index | Value of the first parameter |
|-------|------------------------------|
| 1 | 1 |
| 2 | 1.5 |
| 3 | 0.5 |
| 4 | sqrt(2) |
| 5 | sqrt(10) |
| 6 | sqrt(42) |
| 7 | sqrt(170) |
| 8 | sqrt(648) |
| . . . | . . . |

Optionally, that the second communication apparatus determines the phase noise based on the values of the K PTRSs in the third signal and the preset receiving values of tions of the embodiment corresponding to FIG. 9. A difference is that a formula for calculating the phase noise in this manner is shown by Formula 1-5.

In another embodiment, that a value of an $m^{th}$ PTRS in the K PTRSs is determined based on a value of first interference, a value of second interference, and a preset receiving value of the $m^{th}$ PTRS includes: The value of the $m^{th}$ PTRS is determined based on the value of the first interference, the value of the second interference, the preset receiving value of the $m^{th}$ PTRS, and a second parameter, where the second parameter is a value related to a signal phase. It should be noted that the second parameter indicates a relationship between a phase of the actual receiving value of the $m^{th}$ PTRS and that of the preset receiving value of the mt PTRS under the assumed condition that there is no phase noise. In this manner, the requirement on the values of the K PTRSs is relaxed by using the second parameter.

In this manner, the first communication apparatus preprocesses the values of the K PTRSs, so that under the assumed condition that there is no phase noise, the value of the PTRS received by the receive end (that is, the second communication apparatus) may be determined based on the preset receiving value agreed on in advance and the second parameter, to eliminate the impact of the inter-symbol interference on the value of the PTRS.

In a possible implementation, a sum of the value of the mt PTRS, the value of the first interference, and the value of the second interference is equal to a product of the preset receiving value of the $m^{th}$ PTRS and a phase offset indicated by the second parameter. For example, for the relationship between the value of the PTRS in the first signal and the preset receiving value of the PTRS, refer to Formula 1-6. In this example, the first signal includes N data signals.

$$\begin{cases} \tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) = e^{j\beta_m} S(m), m = 1 \\ \tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) = e^{j\beta_m} S(m), m = 2 \\ \dots \\ \tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) = e^{j\beta_m} S(m), m = K \end{cases} \qquad \text{Formula 1-6}$$

the K PTRSs in the first signal includes: The second communication apparatus determines the phase noise based on the values of the K PTRSs in the third signal, the preset receiving values of the K PTRSs in the first signal, and the first parameter.

For example, the $m^{th}$ PTRS in the third signal is used as an example, and the actual receiving value of the $m^{th}$ PTRS may be represented by Formula 1-5:

$$x(m)e^{j\Theta_m} = AS(m)e^{j\Theta_m} \qquad \text{Formula 1-5}$$

$x(m)e^{j\Theta_m}$ the PTRS that is actually received by the second communication apparatus and that is affected by the phase noise ($e^{j\Theta_m}$). It may be learned from the above analysis that $x(m)$ should be equal to $AS(m)$. In other words, in Formula 1-5, $x(m)e^{j\Theta_m}$ and $AS(m)$ are known, so that the phase noise ($e^{j\Theta_m}$) may be solved.

It should be noted that, for a manner of determining the phase noise by the second communication apparatus and a processing procedure of the third signal, refer to the descrip- $\tilde{S}_{PTRS}(m)$ is the value of the $m^{th}$ PTRS in the first signal, and $$\sum_{n=1}^{N} ISI_{Data_n}(m)$$

is the inter-symbol interference, that is, the first interference, generated by the N data signals on the $m^{th}$ PTRS.

$$\sum_{\substack{m'=1 \\ m' \neq m}}^{K} ISI_{PTRS_{m'}}(m)$$

is the inter-symbol interference, that is, the second interference, generated by the PTRS other than the $m^{th}$ PTRS in the K PTRSs on the $m^{th}$ PTRS. S(m) is the preset receiving value of the $m^{th}$ PTRS. $e^{j\beta_m}$ is the phase offset indicated by the second parameter. The second parameter is $\beta_m$, the second parameter is the value related to the phase, and the second parameter may be an angle value. The value m is an index value (or referred to as a sequence number, a number, a label, or the like) of the PTRS. It should be noted that the index value of the PTRS may alternatively be designed starting from 0. In this case, a value of the $1^{st}$ PTRS is represented as $\tilde{S}_{PTRS}(0)$. In addition, there may be another index value design manner. The design manner of the index value is not limited in this embodiment of this application.

For the first communication apparatus, values of the N data signals and preset receiving values of the K PTRSs are known. There are K PTRS signals in the first signal. Therefore, there are a total of K unknown numbers $\tilde{S}_{PTRS}(m)$s and K equations in Formula 1-6. The K equations may be solved to obtain $\tilde{S}_{PTRS}(m)$, that is, the value of each PTRS.

In a possible implementation, a preset interference value or an interference calculation formula may be further added to a left part of Formula 1-6, to compensate for other interference received by a signal in a transmission process.

Figure 11:
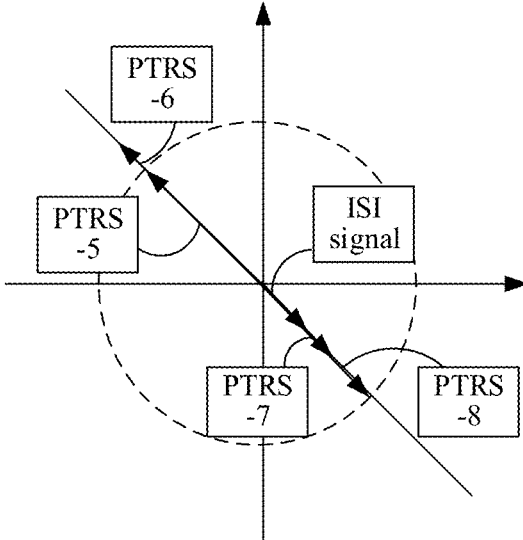
FIG. 11 is a schematic diagram of a phase-adjustable PTRS according to an embodiment of this application.

A principle of the foregoing manner is analyzed. For example, FIG. 11 is a schematic diagram of a phase-adjustable PTRS according to an embodiment of this application. To make a PTRS obtained through elimination of the impact of inter-symbol interference (for example, an ISI signal) completely equal to a preset receiving value (for example, a PTRS-5) of the PTRS, a PTRS that needs to be sent by a transmit end is a PTRS-6. The PTRS-6 requires large energy (as shown by the PTRS-6 in the figure). However, because a high-energy signal causes a PAPR increase, the PTRS-6 affects a PAPR of a system. Therefore, the PTRS sent by the transmit end may be designed as a PTRS-7, so that an amplitude of a signal (for example, a PTRS-8) obtained through addition of the PTRS-8 and the ISI signal is consistent with an amplitude of the preset receiving value of the PTRS, but a phase is opposite to a phase of the preset receiving value. In this way, a PAPR problem caused by the high-energy signal can be alleviated.

In another example of a reverse case, an amplitude of the PTRS-6 that needs to be sent by the transmit end may be excessively small. In this case, the PTRS sent by the transmit end may be designed as a PTRS-7, so that an amplitude of a signal obtained through addition of the PTRS-7 and the ISI signal is consistent with an amplitude of the preset receiving value of the PTRS, but phases are different. In this way, anti-interference (for example, white noise) performance of the PTRS-8 sent by the transmit end can be improved.

Optionally, a value of the second parameter may be one of the following values:

$$\pm \left\{ 0, \frac{\pi}{2}, \frac{\pi}{4}, \frac{\pi}{8}, \frac{3\pi}{8}, \frac{5\pi}{8}, \frac{\pi}{16}, \frac{3\pi}{16}, \frac{5\pi}{16}, \frac{7\pi}{16}, \frac{9\pi}{16} \right\},$$

$$\text{or} \pm \left\{ \pi + \left( 0, \frac{\pi}{2}, \frac{\pi}{4}, \frac{\pi}{8}, \frac{3\pi}{8}, \frac{5\pi}{8}, \frac{\pi}{16}, \frac{3\pi}{16}, \frac{5\pi}{16}, \frac{7\pi}{16}, \frac{9\pi}{16} \right) \right\}.$$

For example, for the value of the second parameter, mainly refer to the following factors. 1. Refer to an amplitude coefficient (for example, amplitude coefficients of constellation points such as a QPSK signal, 16QAM, and 64QAM) of a sending constellation point. 2. Refer to a coefficient of a filter. For example, an interference value of an RRC filter with afa=1 is 0.5 after matching reception. 3. Refer to that an increase in a signal amplitude of a single-carrier signal does not affect a typical PAPR value. In this value setting method of the second parameter, precision of phase noise estimation at the PTRS can be ensured and non-linear loss is not caused.

The following describes a method of determining the value of the second parameter.

The second communication apparatus may preset a value range of the K $\tilde{S}_{PTRS}(m)$. A value in the value range is not excessively large so as to cause a PAPR of the second signal to be large, and is also not excessively small to affect subsequent phase noise calculation. For example, a maximum value in the value range may not be greater than the energy of an outermost constellation point, or not greater than unit signal energy (for example, 1), or the maximum value makes the time domain signal energy generated at the PTRS not greater than maximum peak signal energy, or the like. A minimum value in the value range may be not less than 3 dB times a signal-to-noise ratio of PTRS signal de-modulation.

The second communication apparatus may select one value from a plurality of possible values of the second parameter based on a requirement of the value range. In other words, the value of the second parameter can enable the values of the K $\tilde{S}_{PTRS}(m)$s to fall within the value range.

In this implementation, the method further includes: The first communication apparatus sends fourth indication information to the second communication apparatus, where the fourth indication information indicates the second parameter. Correspondingly, the second communication apparatus obtains the fourth indication information sent by the first communication apparatus.

Optionally, the fourth indication message may include an index corresponding to the second parameter. Table 3 shows a possible correspondence between the value of the second parameter and the index according to an embodiment of this application.

TABLE 3

| Index | Value of the second parameter |
|---|---|
| 1 | 0 |
| 2 | pi (that is, $\pi$) |
| 3 | pi/2 |
| 4 | 3/2pi |
| . . . | . . . |

Optionally, Table 4 shows a possible correspondence between a value set of the second parameter and the index according to an embodiment of this application.

TABLE 4

| Index | Value set of the second parameter |
|---|---|
| 1 | {0, pi} |
| 2 | {0, pi/2, pi, 3/2pi} |
| 3 | {0, pi/4, pi/2, 3pi/4, pi, 5pi/4, 3pi/2, 7pi/4} |
| 4 | {0, pi/8, 2pi/8, 3pi/8, pi/2, . . . , 15pi/8} |
| 5 | {0, pi/16, 2pi/16, 3pi/16, . . . , 31pi/16} |
| . . . | . . . |

In this manner, a small amount of data is required for the index. Because the phase offset caused by the phase noise has a possible value range (for example, [−30°, 30°], that is, [−pi/6, pi/6]), the second communication apparatus may determine, from the value set of the second parameter based on the calculated phase offset of the phase noise and the value range, the second parameter actually used in the first signal. Then, the final phase noise is determined based on the second parameter. For example, the phase offset of the phase noise calculated by the second communication apparatus is 7pi/6, and the value set of the second parameter is {0, pi}. Because the phase offset caused by the phase noise falls within the range of [−pi/6, pi/6], the second communication apparatus may determine that the second parameter actually used in the first signal is pi, and the phase noise should be pi/6.

Optionally, that the second communication apparatus determines the phase noise based on the values of the K PTRSs in the third signal and the preset receiving values of the K PTRSs in the first signal includes: The second communication apparatus determines the phase noise based on the values of the K PTRSs in the third signal, the preset receiving values of the K PTRSs in the first signal, and the second parameter.

For example, the $m^{th}$ PTRS in the third signal is used as an example, and the actual receiving value of the $m^{th}$ PTRS may be represented by Formula 1-7:

$$x(m)e^{j\Theta_m}=e^{j\beta_m}S(m)e^{j\Theta_m} \qquad \text{Formula 1-7}$$

using the first parameter, and a phase requirement on the values of the K PTRSs is relaxed by using the second parameter.

In this manner, the first communication apparatus preprocesses the values of the K PTRSs, so that under the assumed condition that there is no phase noise, the value of the PTRS received by the receive end (that is, the second communication apparatus) may be determined based on the preset receiving value agreed on in advance, the first parameter, and the second parameter, to eliminate the impact of the inter-symbol interference on the value of the PTRS.

In a possible implementation, a sum of the value of the mt PTRS, the value of the first interference, and the value of the second interference is equal to a product of the preset receiving value of the $m^{th}$ PTRS, the first parameter, and a phase offset indicated by the second parameter. For example, for the relationship between the value of the PTRS in the first signal and the preset receiving value of the PTRS, refer to Formula 1-8. In this example, the first signal includes N data signals.

$$\begin{cases} \tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) = Ae^{j\beta_m}S(m), \ m=1 \\[2ex] \tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) = Ae^{j\beta_m}S(m), \ m=2 \\[2ex] \dots \\[2ex] \tilde{S}_{PTRS}(m) + \sum_{n=1}^{N} ISI_{Data_n}(m) + \sum_{\substack{m'=1 \\ m' \neq m}}^{K} ISI_{PTRS_{m'}}(m) = Ae^{j\beta_m}S(m), \ m=K \end{cases} \qquad \text{Formula 1-8}$$

$x(m)e^{j\Theta_m}$ is the PTRS that is actually received by the second communication apparatus and that is affected by the phase noise $(e^{j\Theta_m})$. It may be learned from the above analysis that $x(m)$ should be equal to $e^{j\Theta_m}S(m)$. In other words, in Formula 1-7, $x(m)e^{j\Theta_m}$ and $e^{j\beta_m}S(m)$ are known, so that the phase noise $(e^{j\Theta_m})$ may be solved.

It should be noted that, for a manner of determining the phase noise by the second communication apparatus and a processing procedure of the third signal, refer to the descriptions of the embodiment corresponding to FIG. 9. A difference is that a formula for calculating the phase noise in this manner is shown by Formula 1-7.

In another embodiment, that a value of an $m^{th}$ PTRS in the K PTRSs is determined based on a value of first interference, a value of second interference, and a preset receiving value of the $m^{th}$ PTRS includes: The value of the $m^{th}$ PTRS is determined based on the value of the first interference, the value of the second interference, the preset receiving value of the $m^{th}$ PTRS, a first parameter, and a second parameter, where the first parameter is a value related to a signal amplitude, and the second parameter is a value related to a signal phase. It should be noted that the first parameter indicates a relationship between an amplitude of the actual receiving value of the $m^{th}$ PTRS and that of the preset receiving value of the $m^{th}$ PTRS under the assumed condition that there is no phase noise. The second parameter indicates a relationship between a phase of the actual receiving value of the $m^{th}$ PTRS and that of the preset receiving value of the $m^{th}$ PTRS under the assumed condition that there is no phase noise. In this manner, an amplitude requirement on the values of the K PTRSs is relaxed by $\tilde{S}_{PTRS}(m)$ is the value of the $m^{th}$ PTRS in the first signal, and $$\sum_{n=1}^{N} ISI_{Data_n}(m)$$

is the inter-symbol interference, that is, the first interference, generated by the N data signals on the $m^{th}$ PTRS.

$$\sum_{\substack{m'=1 \\ m' \neq m}}^{K} ISI_{PTRS_{m'}}(m)$$

is the inter-symbol interference, that is, the second interference, generated by the PTRS other than the $m^{th}$ PTRS in the K PTRSs on the $m^{th}$ PTRS. $S(m)$ is the preset receiving value of the $m^{th}$ PTRS. A is the first parameter, the first parameter is the value related to the amplitude, and A may be a real number. $e^{j\beta_m}$ is the phase offset indicated by the second parameter. The second parameter is $\beta_m$, the second parameter is the value related to the phase, and the second parameter may be an angle value. The value m is an index value (or referred to as a sequence number, a number, a label, or the like) of the PTRS. It should be noted that the index value of the PTRS may alternatively be designed starting from 0. In this case, a value of the $1^{st}$ PTRS is represented as $\tilde{S}_{PTRS}(0)$. In addition, there may be another index value design manner. The design manner of the index value is not limited in this embodiment of this application.

For the first communication apparatus, values of the N data signals and preset receiving values of the K PTRSs are known. There are K PTRS signals in the first signal. Therefore, there are a total of K unknown numbers $\tilde{S}_{PTRS}(m)$s and K equations in Formula 1-8. The K equations may be solved to obtain $\tilde{S}_{PTRS}(m)$, that is, the value of each PTRS.

In a possible implementation, a preset interference value or an interference calculation formula may be further added to a left part of Formula 1-8, to compensate for other interference received by a signal in a transmission process. For principle analysis of this manner, refer to the descriptions in the foregoing content. In this manner, both amplitude adjustment and phase offset are considered, and details are not described herein again.

In addition, for possible values of the first parameter and the second parameter and a manner of determining the values, refer to the descriptions in the foregoing method. It should be noted that, in a process of determining the values of the first parameter and the second parameter, the impact of the two parameters on the values of the K $\tilde{S}_{PTRS}(m)$s needs to be considered. The finally determined values of the first parameter and the second parameter can enable the values of the K $\tilde{S}_{PTRS}(m)$s to fall within an appropriate value range of the values.

In this implementation, the method further includes: The first communication apparatus sends fifth indication information to the second communication apparatus, where the fifth indication information indicates the first parameter and the second parameter. Correspondingly, the second communication apparatus obtains the fifth indication information sent by the first communication apparatus. Optionally, in this implementation, the first communication apparatus may alternatively send third indication information and fourth indication information to the second communication apparatus successively or simultaneously. For the descriptions of the third indication information and the fourth indication information, refer to the descriptions in the foregoing content. Details are not described herein again.

Optionally, the fifth indication message may include an index corresponding to the first parameter and an index corresponding to the second parameter. For a correspondence between a value of the first parameter and the index and a correspondence between a value of the second parameter and the index, refer to the descriptions in the foregoing content. Details are not described herein again.

Optionally, that the second communication apparatus determines the phase noise based on the values of the K PTRSs in the third signal and the preset receiving values of the K PTRSs in the first signal includes: The second communication apparatus determines the phase noise based on the values of the K PTRSs in the third signal, the preset receiving values of the K PTRSs in the first signal, the first parameter, and the second parameter.

For example, the $m^{th}$ PTRS in the third signal is used as an example, and the actual receiving value of the $m^{th}$ PTRS may be represented by Formula 1-9:

$$x(m)e^{j\Theta_m} = Ae e^{j\beta_m} S(m)e^{j\Theta_m} \qquad \text{Formula 1-9}$$

$x(m)e^{j\Theta_m}$ is the PTRS that is actually received by the second communication apparatus and that is affected by the phase noise ($e^{j\Theta_m}$). It may be learned from the above analysis that $x(m)$ should be equal to $Ae^{j\beta_m} S(m)$. In other words, in Formula 1-9, $x(m)e^{j\Theta_m}$ and $Ae^{j\beta_m} S(m)$ are known, so that the phase noise ($e^{j\Theta_m}$) may be solved.

It should be noted that, for a manner of determining the phase noise by the second communication apparatus and a processing procedure of the third signal, refer to the descriptions of the embodiment corresponding to FIG. 9. A difference is that a formula for calculating the phase noise in this manner is shown by Formula 1-9.

Figure 12:
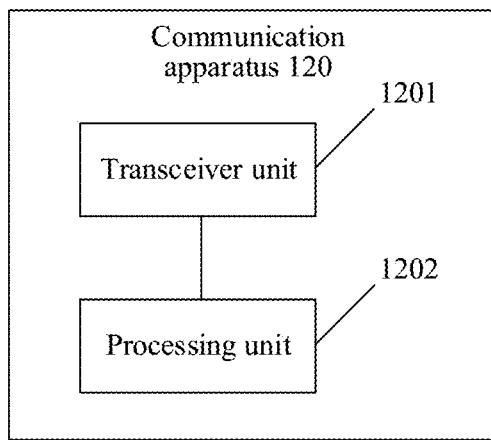
FIG. 12 is a schematic diagram of a structure of a communication apparatus according to an embodiment of this application.

To implement functions in the method provided in embodiments of this application, the first communication apparatus and the second communication apparatus may include a hardware structure and a software module, and the foregoing functions are implemented in a form of the hardware structure, the software module, or a combination of the hardware structure and the software module. A specific function in the foregoing functions may be performed by the hardware structure, the software module, or the combination of the hardware structure and the software module. FIG. 12 is a schematic diagram of a structure of a communication apparatus according to an embodiment of this application. The communication apparatus 120 includes a transceiver unit 1201 and a processing unit 1202. The following describes the two units in detail.

In an embodiment:

The transceiver unit 1201 is configured to obtain a first signal, where the first signal includes a data signal and K phase-tracking reference signals PTRSs. A value of an $m^{th}$ PTRS in the K PTRSs is determined based on a value of first interference, a value of second interference, and a preset receiving value of the $m^{th}$ PTRS. Specifically, the first interference is inter-symbol interference generated by the data signal on the $m^{th}$ PTRS, the second interference is inter-symbol interference generated by a PTRS other than the $m^{th}$ PTRS in the K PTRSs on the mt PTRS, K and m are positive integers, and $1 \leq m \leq K$.

The processing unit 1202 is configured to perform baseband signal processing on the first signal to obtain a second signal.

The transceiver unit 1201 is further configured to send the second signal to a second communication apparatus.

In a possible implementation, the value of the first interference and the value of the second interference are determined based on a type of a receiver.

In a possible implementation, the transceiver unit 1201 is further configured to obtain first indication information sent by the second communication apparatus, where the first indication information indicates the type of the receiver.

In a possible implementation, the transceiver unit 1201 is further configured to send second indication information to the second communication apparatus, where the second indication information indicates the type of the receiver.

In a possible implementation, that a value of an $m^{th}$ PTRS in the K PTRSs is determined based on a value of first interference, a value of second interference, and a preset receiving value of the $m^{th}$ PTRS includes: The value of the $m^{th}$ PTRS is determined based on the value of the first interference, the value of the second interference, the preset receiving value of the $m^{th}$ PTRS, and a first parameter, where the first parameter is a value related to a signal amplitude.

In a possible implementation, the transceiver unit 1201 is further configured to send third indication information to the second communication apparatus, where the third indication information indicates the first parameter.

In a possible implementation, that a value of an $m^{th}$ PTRS in the K PTRSs is determined based on a value of first interference, a value of second interference, and a preset receiving value of the mt PTRS includes: The value of the $m^{th}$ PTRS is determined based on the value of the first interference, the value of the second interference, the preset receiving value of the $m^{th}$ PTRS, and a second parameter, where the second parameter is a value related to a signal phase.

In a possible implementation, the transceiver unit 1201 is further configured to send fourth indication information to the second communication apparatus, where the fourth indication information indicates the second parameter.

It should be noted that, in the foregoing embodiment, the communication apparatus 120 may be a network device, may be an apparatus in the network device, or may be an apparatus that can be used in matching with the network device. Alternatively, the communication device 1201 may be a terminal device, may be an apparatus in the terminal device, or may be an apparatus that can be used in matching with the terminal device.

Specifically, for operations performed by the units of the communication apparatus 120 shown in FIG. 12, refer to related content about the first communication apparatus in the method embodiment corresponding to FIG. 6. Details are not described herein again. The units may be implemented by hardware, software, or a combination of software and hardware. In an embodiment, functions of the transceiver unit 1201 and the processing unit 1202 in the foregoing content may be implemented by one or more processors in the communication apparatus 120.

Through the communication apparatus 120 in this embodiment, values of the K PTRSs in the first signal may be preprocessed, so that under an assumed condition that there is no phase noise, a value of a PTRS received by a receive end may be determined based on a preset receiving value agreed on in advance, to eliminate any impact of inter-symbol interference on the value of the PTRS. Because the value of the PTRS actually received by the receive end is further affected by the phase noise, the phase noise may be calculated by using an actual receiving value and the preset receiving value of the PTRS.

In another embodiment:

The transceiver unit 1201 is configured to obtain a third signal, where the third signal is a signal obtained through introduction of phase noise into a second signal sent by a first communication apparatus, and the third signal includes a data signal and K phase-tracking reference signals PTRSs.

The second signal is a signal obtained through baseband signal processing performed on a first signal. The first signal includes a data signal and K PTRSs. A value of an $m^{th}$ PTRS in the K PTRSs in the first signal is determined based on a value of first interference, a value of second interference, and a preset receiving value of the $m^h$ PTRS. Specifically, the first interference is inter-symbol interference generated by the data signal in the first signal on the $m^{th}$ PTRS, the second interference is inter-symbol interference generated by a PTRS other than the $m^{th}$ PTRS in the K PTRSs in the first signal on the $m^{th}$ PTRS, K and m are positive integers, and $1 \le m \le K$.

The processing unit 1202 is configured to determine the phase noise based on values of the K PTRSs in the third signal and preset receiving values of the K PTRSs in the first signal.

In a possible implementation, the processing unit 1202 is further configured to: convert the third signal into a first frequency domain signal; perform channel equalization on the first frequency domain signal to obtain a second frequency domain signal; preprocess the second frequency domain signal based on a receiver, and convert the processed second frequency domain signal into a first time domain signal; and obtain the values of the K PTRSs in the third signal from the first time domain signal.

In a possible implementation, the transceiver unit 1201 is further configured to send first indication information to the first communication apparatus, where the first indication information indicates a type of the receiver.

In a possible implementation, the transceiver unit 1201 is further configured to obtain second indication information sent by the first communication apparatus, where the second indication information indicates a type of the receiver.

In a possible implementation, the processing unit 1202 is further configured to: convert the first frequency domain signal into a second time domain signal; and perform phase noise compensation on the second time domain signal based on the phase noise.

In a possible implementation, the transceiver unit 1201 is further configured to obtain third indication information sent by the first communication apparatus, where the third indication information indicates a first parameter, and the first parameter is a value related to a signal amplitude. The processing unit is specifically configured to determine the phase noise based on the values of the K PTRSs in the third signal, the preset receiving values of the K PTRSs in the first signal, and the first parameter.

In a possible implementation, the transceiver unit 1201 is further configured to obtain fourth indication information sent by the first communication apparatus, where the fourth indication information indicates a second parameter, and the second parameter is a value related to a signal phase. The processing unit is specifically configured to determine the phase noise based on the values of the K PTRSs in the third signal, the preset receiving values of the K PTRSs in the first signal, and the second parameter.

It should be noted that, in the foregoing embodiment, the communication apparatus 120 may be a network device, may be an apparatus in the network device, or may be an apparatus that can be used in matching with the network device. Alternatively, the communication device 1201 may be a terminal device, may be an apparatus in the terminal device, or may be an apparatus that can be used in matching with the terminal device.

Specifically, for operations performed by the units of the communication apparatus 120 shown in FIG. 12, refer to related content about the second communication apparatus in the method embodiment corresponding to FIG. 6. Details are not described herein again. The units may be implemented by hardware, software, or a combination of software and hardware. In an embodiment, functions of the transceiver unit 1201 and the processing unit 1202 in the foregoing content may be implemented by one or more processors in the communication apparatus 120.

Through the communication apparatus 120 in this embodiment, the third signal sent by a transmit end may be obtained, and the phase noise in the third signal may be calculated based on the actual received values of the K PTRSs in the third signal and the preset receiving values that are of the K PTRSs in the first signal and that are agreed on in advance.

Figure 13:
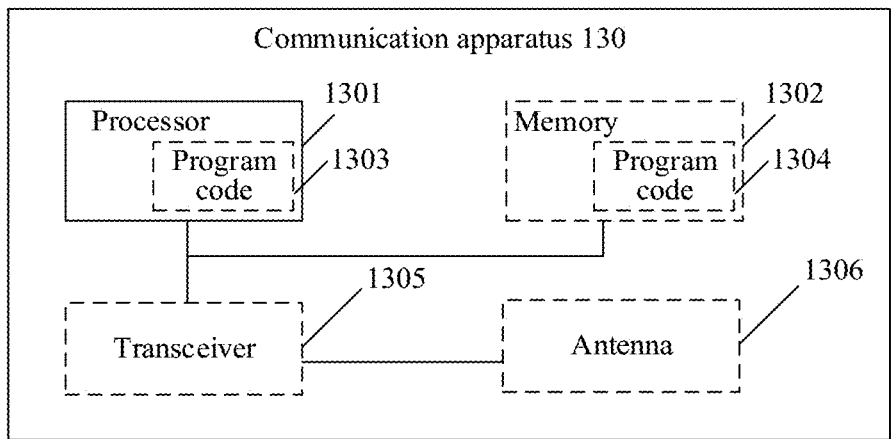
FIG. 13 is a schematic diagram of a structure of another communication apparatus according to an embodiment of this application.

FIG. 13 is a schematic diagram of a structure of another communication apparatus according to an embodiment of this application. The communication apparatus 130 may be configured to implement the method described in the foregoing method embodiments. For details, refer to the descriptions in the foregoing method embodiments.

The communication apparatus 130 may include one or more processors 1301. The processor 1301 may be a general-purpose processor, a dedicated processor, or the like. The processor 1301 may be configured to control the communication apparatus (for example, a network device, a chip of the network device, a terminal device, or a chip of the terminal device), execute a software program, and process data of the software program.

Optionally, the communication apparatus 130 may include one or more memories 1302. The memory 1302 may store program code 1304. The program code may be run on the processor 1301, so that the communication apparatus 130 performs the method described in the foregoing method embodiments. Optionally, the memory 1302 may further store data. The processor 1301 and the memory 1302 may be separately disposed, or may be integrated together.

Optionally, the communication apparatus 130 may further include a transceiver 1305 and an antenna 1306. The transceiver 1305 may be referred to as a transceiver unit, a transceiver machine, a transceiver circuit, or the like, and is configured to implement a transceiver function. The transceiver 1305 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

In an embodiment:

The processor 1301 is configured to obtain a first signal through the transceiver 1305, where the first signal includes a data signal and K phase-tracking reference signals PTRSs. A value of an $m^{th}$ PTRS in the K PTRSs is determined based on a value of first interference, a value of second interference, and a preset receiving value of the $m^{th}$ PTRS. Specifically, the first interference is inter-symbol interference generated by the data signal on the $m^{th}$ PTRS, the second interference is inter-symbol interference generated by a PTRS other than the $m^{th}$ PTRS in the K PTRSs on the $m^{th}$ PTRS, K and m are positive integers, and 1 m≤K.

The processor 1301 is further configured to send a second signal to a second communication apparatus through the transceiver 1305, where the second signal is a signal obtained through baseband signal processing performed on the first signal.

In a possible implementation, the value of the first interference and the value of the second interference are determined based on a type of the receiver.

In a possible implementation, the processor 1301 is further configured to invoke the program code 1304 from the memory 1302 to perform the following operation: obtaining first indication information sent by the second communication apparatus, where the first indication information indicates the type of the receiver.

In a possible implementation, the processor 1301 is further configured to invoke the program code 1304 from the memory 1302 to perform the following operation: sending second indication information to the second communication apparatus, where the second indication information indicates the type of the receiver.

In a possible implementation, that a value of an $m^{th}$ PTRS in the K PTRSs is determined based on a value of first interference, a value of second interference, and a preset receiving value of the mt PTRS includes: The value of the $m^{th}$ PTRS is determined based on the value of the first interference, the value of the second interference, the preset receiving value of the $m^{th}$ PTRS, and a first parameter, where the first parameter is a value related to a signal amplitude.

In a possible implementation, the processor 1301 is further configured to invoke the program code 1304 from the memory 1302 to perform the following operation: A first communication apparatus sends third indication information to the second communication apparatus, where the third indication information indicates the first parameter.

In a possible implementation, that a value of an $m^{th}$ PTRS in the K PTRSs is determined based on a value of first interference, a value of second interference, and a preset receiving value of the $m^{th}$ PTRS includes: The value of the $m^{th}$ PTRS is determined based on the value of the first interference, the value of the second interference, the preset receiving value of the $m^{th}$ PTRS, and a second parameter, where the second parameter is a value related to a signal phase.

In a possible implementation, the processor 1301 is further configured to invoke the program code 1304 from the memory 1302 to perform the following operation: sending fourth indication information to the second communication apparatus, where the fourth indication information indicates the second parameter.

It should be noted that, in the foregoing embodiment, the communication apparatus 130 may be a network device, may be a terminal device, may be a chip, a chip system, a processor, or the like that supports the network device in implementing the foregoing methods, or may be a chip, a chip system, or a processor, or the like that supports the terminal device in implementing the foregoing methods.

Specifically, for an operation performed by the communication apparatus 130, refer to related content about the first communication apparatus in the method embodiment corresponding to FIG. 6. Details are not described herein again. Through the communication apparatus 130 in this embodiment, values of the K PTRSs in the first signal may be preprocessed, so that under an assumed condition that there is no phase noise, a value of a PTRS received by a receive end may be determined based on a preset receiving value agreed on in advance, to eliminate any impact of inter-symbol interference on the value of the PTRS. Because the value of the PTRS actually received by the receive end is further affected by the phase noise, the phase noise may be calculated by using an actual receiving value and the preset receiving value of the PTRS.

In another embodiment:

The processor 1301 is configured to obtain a third signal through the transceiver 1305, where the third signal is a signal obtained through introduction of phase noise into a second signal sent by a first communication apparatus, and the third signal includes a data signal and K phase-tracking reference signals PTRSs.

The second signal is a signal obtained through baseband signal processing performed on a first signal, and the first signal includes a data signal and K PTRSs. A value of an mt PTRS in the K PTRSs in the first signal is determined based on a value of first interference, a value of second interference, and a preset receiving value of the $m^{th}$ PTRS. Specifically, the first interference is inter-symbol interference generated by the data signal in the first signal on the $m^{th}$ PTRS, the second interference is inter-symbol interference generated by a PTRS other than the $m^{th}$ PTRS in the K PTRSs in the first signal on the $m^{th}$ PTRS, K and m are positive integers, and 1≤m≤K.

The processor 1301 is further configured to determine the phase noise based on values of the K PTRSs in the third signal and preset receiving values of the K PTRSs in the first signal.

In a possible implementation, the processor 1301 is further configured to invoke the program code 1304 from the memory 1302 to perform the following operations: converting the third signal into a first frequency domain signal; performing channel equalization on the first frequency domain signal to obtain a second frequency domain signal; preprocessing the second frequency domain signal based on the receiver, and converting the processed second frequency domain signal into a first time domain signal; and obtaining the values of the K PTRSs in the third signal from the first time domain signal.

In a possible implementation, the processor 1301 is further configured to invoke the program code 1304 from the memory 1302 to perform the following operation: sending first indication information to the first communication apparatus, where the first indication information indicates a type of the receiver.

In a possible implementation, the processor 1301 is further configured to invoke the program code 1304 from the memory 1302 to perform the following operation: obtaining second indication information sent by the first communication apparatus, where the second indication information indicates a type of the receiver.

In a possible implementation, the processor 1301 is further configured to invoke the program code 1304 from the memory 1302 to perform the following operations: converting the first frequency domain signal into a second time domain signal; and performing phase noise compensation on the second time domain signal based on the phase noise.

In a possible implementation, the processor 1301 is further configured to invoke the program code 1304 from the memory 1302 to perform the following operations: receiving third indication information sent by the first communication apparatus, where the third indication information indicates a first parameter, and the first parameter is a value related to a signal amplitude; and determining the phase noise based on the values of the K PTRSs in the third signal, the preset receiving values of the K PTRSs in the first signal, and the first parameter.

In a possible implementation, the processor 1301 is further configured to invoke the program code 1304 from the memory 1302 to perform the following operations: receiving fourth indication information sent by the first communication apparatus, where the fourth indication information indicates a second parameter, and the second parameter is a value related to a signal phase; and determining the phase noise based on the values of the K PTRSs in the third signal, the preset receiving values of the K PTRSs in the first signal, and the second parameter.

It should be noted that, in the foregoing embodiment, the communication apparatus 130 may be a network device, may be a terminal device, may be a chip, a chip system, a processor, or the like that supports the network device in implementing the foregoing methods, or may be a chip, a chip system, or a processor, or the like that supports the terminal device in implementing the foregoing methods.

Specifically, for an operation performed by the communication apparatus 130, refer to related content about the second communication apparatus in the method embodiment corresponding to FIG. 6. Details are not described herein again. Through the communication apparatus 130 in this embodiment, the third signal sent by a transmit end may be obtained, and the phase noise in the third signal may be calculated based on the actual received values of the K PTRSs in the third signal and the preset receiving values that are of the K PTRSs in the first signal and that are agreed on in advance.

In another possible design, the transceiver may be a transceiver circuit, an interface, or an interface circuit. The transceiver circuit, the interface, or the interface circuit configured to implement receiving and sending functions may be separately disposed, or may be integrated together.

The transceiver circuit, the interface, or the interface circuit may be configured to read and write code or data. Alternatively, the transceiver circuit, the interface, or the interface circuit may be configured to transmit or transfer a signal.

In still another possible design, optionally, the processor 1301 may store program code 1303. When the program code 1303 is run on the processor 1301, the communication apparatus 130 is enabled to perform the method described in the foregoing method embodiments. The program code 1303 may be fixed in the processor 1301, and in this case, the processor 1301 may be implemented by hardware.

In still another possible design, the communication apparatus 130 may include a circuit, and the circuit may implement a sending, receiving, or communication function in the foregoing method embodiments.

The processor and the transceiver described in this application may be implemented on an integrated circuit (IC), an analog IC, a radio frequency integrated circuit RFIC, a mixed-signal IC, an application-specific integrated circuit (ASIC), a printed circuit board (PCB), an electronic device, or the like.

The communication apparatus described in the foregoing embodiments may be a network device or a terminal device. However, a scope of the communication apparatus described in this application is not limited thereto, and the structure of the communication apparatus may not be limited by FIG. 13. The communication apparatus may be an independent device or may be a part of a large device. For example, the communication apparatus may be the following:

(1) an independent integrated circuit IC, a chip, a chip system, or a subsystem;

(2) a set with one or more ICs, where optionally, the IC set may also include a storage component configured to store data and program code;

(3) an ASIC, for example, a modem;

(4) a module that can be embedded in another device;

(5) a receiver, an intelligent terminal, a wireless device, a handset, a mobile unit, a vehicle-mounted device, a cloud device, an artificial intelligence device, and the like; and (6) others.

Figure 14:
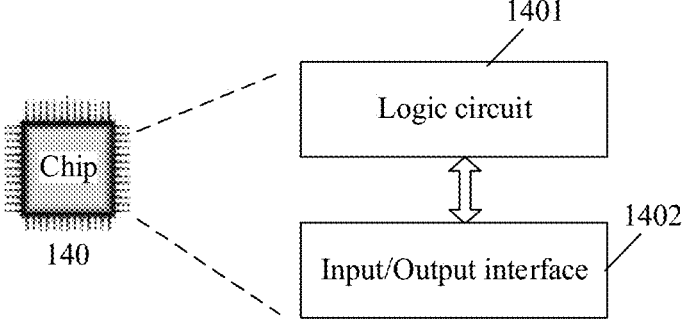
FIG. 14 is a schematic diagram of a structure of a chip according to an embodiment of this application.

For a case in which the communication apparatus may be a chip or a chip system, refer to a schematic diagram of a structure of a chip shown in FIG. 14. The chip 140 shown in FIG. 14 includes a logic circuit 1401 and an input/output interface 1402. There may be one or more logic circuits 1401 and there may be a plurality of input/output interfaces 1402.

For a case in which the chip is configured to implement a function of the first communication apparatus in embodiments of this application:

The input/output interface 1402 is configured to input a first signal.

The input/output interface 1402 is further configured to output a second signal.

The logic circuit 1401 is configured to process the first signal and the second signal, and perform the following operation: obtaining the first signal through the input/output interface 1402, where the first signal includes a data signal and K phase-tracking reference signals PTRSs. A value of an $m^{th}$ PTRS in the K PTRSs is determined based on a value of first interference, a value of second interference, and a preset receiving value of the $m^{th}$ PTRS. Specifically, the first interference is inter-symbol interference generated by the data signal on the $m^{th}$ PTRS, the second interference is inter-symbol interference generated by a PTRS other than the $m^{th}$ PTRS in the K PTRSs on the $m^{th}$ PTRS, K and m are positive integers, and $1 \le m \le K$.

The second signal is sent to a second communication apparatus through the input/output interface 1402, where the second signal is a signal obtained through baseband signal processing performed on the first signal.

Specifically, in this case, for an operation performed by the logic circuit 1401, refer to the descriptions of the first communication apparatus in the embodiment corresponding to FIG. 6.

For a case in which the chip is configured to implement a function of the second communication apparatus in embodiments of this application:

The input/output interface 1402 is configured to input a third signal.

The logic circuit 1401 is configured to process the third signal, and perform the following operation: obtaining the third signal through the input/output interface 1402, where the third signal is a signal obtained through introduction of phase noise into a second signal sent by a first communication apparatus, and the third signal includes a data signal and K phase-tracking reference signals PTRSs. The second signal is a signal obtained through baseband signal processing performed on a first signal, and the first signal includes a data signal and K PTRSs. A value of an $m^{th}$ PTRS in the K PTRSs in the first signal is determined based on a value of first interference, a value of second interference, and a preset receiving value of the $m^{th}$ PTRS. Specifically, the first interference is inter-symbol interference generated by the data signal in the first signal on the $m^{th}$ PTRS, the second interference is inter-symbol interference generated by a PTRS other than the $m^h$ PTRS in the K PTRSs in the first signal on the $m^{th}$PTRS, K and m are positive integers, and $1 \leq m \leq K$. The phase noise is determined based on values of the K PTRSs in the third signal and preset receiving values of the K PTRSs in the first signal.

Specifically, in this case, for an operation performed by the logic circuit 1401, refer to the descriptions of the second communication apparatus in the embodiment corresponding to FIG. 6.

A person skilled in the art may further understand that various illustrative logical blocks and steps that are listed in embodiments of this application may be implemented by using electronic hardware, computer software, or a combination thereof. Whether the functions are implemented by using hardware or software depends on a particular application and a design requirement of an entire system. A person skilled in the art may use various methods to implement the described functions for each particular application, but it should not be considered that the implementation goes beyond the protection scope of embodiments of this application.

This application further provides a computer-readable storage medium storing a computer program. When the computer-readable storage medium is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

A person of ordinary skill in the art may understand that various numbers such as "first" and "second" in this application are merely for differentiation for ease of description, and are not intended to limit the scope and sequence of embodiments of this application.

Correspondences shown in the tables in this application may be configured, or may be predefined. Values of information in the tables are merely examples, and may be configured as other values. This is not limited in this application. When the correspondences between the information and parameters are configured, not all the correspondences shown in the tables need to be configured. For example, in the table in this application, correspondences shown in some rows may alternatively not be configured. For another example, proper deformations and adjustments such as splitting and combination may be performed based on the foregoing tables. Names of parameters shown in headings of the foregoing tables may alternatively be other names that can be understood by the communication apparatus, and values or representation manners of the parameters may alternatively be other values or representation manners that can be understood by the communication apparatus. When the foregoing tables are implemented, another data structure, for example, an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

What is claimed is:

1. A phase noise determining method, comprising:

obtaining, by a first communication apparatus, a first signal comprising a data signal and K phase-tracking reference signals PTRSs, wherein a value of an $m^{th}$ PTRS in the K PTRSs is determined based on a value of a first interference, a value of a second interference, and a preset receiving value of the $m^{th}$ PTRS, wherein the first interference is an inter-symbol interference generated by the data signal on the $m^{th}$ PTRS, the second interference is an inter-symbol interference generated by a PTRS other than the $m^{th}$ PTRS in the K PTRSs, K and m are positive integers, and $1 \leq m \leq K$; and sending, by the first communication apparatus, a second signal to a second communication apparatus, wherein the second signal is a signal obtained through baseband signal processing performed on the first signal.

2. The method according to claim 1, wherein the value of the first interference and the value of the second interference are determined based on a type of a receiver.

3. The method according to claim 1, wherein before the obtaining, by the first communication apparatus, the first signal, the method further comprises:

obtaining, by the first communication apparatus, first indication information sent by the second communication apparatus, wherein the first indication information indicates the type of the receiver.

4. The method according to claim 2, wherein the method further comprises:

sending, by the first communication apparatus, second indication information to the second communication apparatus, wherein the second indication information indicates the type of the receiver.

5. The method according to claim 1, wherein the value of the $m^{th}$ PTRS is determined based additionally on a first parameter that is a value related to a signal amplitude.

6. The method according to claim 5, wherein the method further comprises:

sending, by the first communication apparatus, third indication information to the second communication apparatus, wherein the third indication information indicates the first parameter.

7. The method according to claim 1, wherein the value of the $m^{th}$ PTRS is determined based additionally on a second parameter that is a value related to a signal phase.

8. The method according to claim 7, wherein the method comprises:

sending, by the first communication apparatus, fourth indication information to the second communication apparatus, wherein the fourth indication information indicates the second parameter.

9. A phase noise determining method, comprising:

obtaining, by a first communication apparatus, a first signal, wherein the first third signal is a-signal obtained through introduction of phase noise into a second signal sent by a second communication apparatus, and the first signal comprises a data signal and K phase-tracking reference signals PTRSs, wherein the second signal is obtained through baseband signal processing performed on a third signal, the third signal comprises a data signal and K PTRSs, a value of an $m^{th}$ PTRS in the K PTRSs in the third signal is determined based on a value of a first interference, a value of a second interference, and a preset receiving value of the $m^{th}$ PTRS, the first interference is an inter-symbol interference generated by the data signal in the third signal on the $m^{th}$ PTRS, the second interference is an inter-symbol interference generated by a PTRS other than the $m^{th}$ PTRS in the K PTRSs in the third signal on the $m^{th}$ PTRS, K and m are positive integers, and $1 \leq m \leq K$; and determining, by the first communication apparatus, the phase noise based on values of the K PTRSs in the first signal and preset receiving values of the K PTRSs in the third signal.

10. The method according to claim 9, wherein before the determining, by the first communication apparatus, the phase noise based on values of the K PTRSs in the first signal and preset receiving values of the K PTRSs in the third signal, the method further comprises:

converting, by the first communication apparatus, the first signal into a first frequency domain signal;

performing, by the first communication apparatus, channel equalization on the first frequency domain signal to obtain a second frequency domain signal;

preprocessing, by the first communication apparatus, the second frequency domain signal based on a receiver, and converting the processed second frequency domain signal into a first time domain signal; and obtaining, by the first communication apparatus, the values of the K PTRSs in the first signal from the first time domain signal.

11. The method according to claim 10, wherein the method further comprises:

sending, by the first communication apparatus, first indication information to the second communication apparatus, wherein the first indication information indicates a type of the receiver.

12. The method according to claim 10, wherein the method further comprises:

obtaining, by the first communication apparatus, second indication information sent by the second communication apparatus, wherein the second indication information indicates a type of the receiver.

13. The method according to claim 10, wherein the method further comprises:

converting, by the first communication apparatus, the first frequency domain signal into a second time domain signal; and performing, by the first communication apparatus, phase noise compensation on the second time domain signal based on the phase noise.

14. The method according to claim 9, wherein the method further comprises:

receiving, by the first communication apparatus, third indication information sent by the second communication apparatus, wherein the third indication information indicates a first parameter, and the first parameter is a value related to a signal amplitude; and determining, by the first communication apparatus, the phase noise based on values of the K PTRSs in the first signal and preset receiving values of the K PTRSs in the third signal comprises:

determining, by the first communication apparatus, the phase noise based on the values of the K PTRSs in theFirsts signal, the preset receiving values of the K PTRSs in the third signal, and the first parameter.

15. The method according to claim 9, wherein the method further comprises:

receiving, by the first communication apparatus, fourth indication information sent by the second communication apparatus, wherein the fourth indication information indicates a second parameter, and the second parameter is a value related to a signal phase; and determining, by the first communication apparatus, the phase noise based on values of the K PTRSs in the first signal and preset receiving values of the K PTRSs in the third signal comprises:

determining, by the first communication apparatus, the phase noise based on the values of the K PTRSs in the first signal, the preset receiving values of the K PTRSs in the third signal, and the second parameter.

16. A communication apparatus comprising:

a transceiver unit and a processing unit, wherein the transceiver unit is configured to obtain a first signal comprising a data signal and K phase-tracking reference signals PTRSs, wherein a value of an $m^{th}$ PTRS in the K PTRSs is determined based on a value of a first interference, a value of a second interference, and a preset receiving value of the $m^{th}$ PTRS, wherein the first interference is an inter-symbol interference generated by the data signal on the $m^{th}$ PTRS, the second interference is an inter-symbol interference generated by a PTRS other than the $m^{th}$ PTRS in the K PTRSs, K and m are positive integers, and $1 \leq m \leq K$;

the processing unit is configured to perform baseband signal processing on the first signal to obtain a second signal; and the transceiver unit is further configured to send the second signal to a second communication apparatus.

17. The communication apparatus according to claim 16, wherein the value of the first interference and the value of the second interference are determined based on a type of a receiver.

18. The communication apparatus according to claim 17, wherein the transceiver unit is further configured to:

obtain first indication information sent by the second communication apparatus, wherein the first indication information indicates the type of the receiver.

19. The communication apparatus according to claim 17, wherein the transceiver unit is further configured to:

send second indication information to the second communication apparatus, wherein the second indication information indicates the type of the receiver.

20. The communication apparatus according to claim 16, wherein the value of the $m^{th}$ PTRS is determined based additionally on a first parameter that is a value related to a signal amplitude.

* * * * *